(12) United States Patent
Lee et al.

(10) Patent No.: US 10,585,873 B2
(45) Date of Patent: Mar. 10, 2020

(54) ATOMIC PROCESSING OF COMPOUND DATABASE TRANSACTIONS THAT MODIFY A METADATA ENTITY

(71) Applicant: SAP SE, Walldorf (DE)

(72) Inventors: Juchang Lee, Seoul (KR); Joo Yeon Lee, Seoul (KR); Michael Muehle, Walldorf (DE); Myung Sun Park, Seoul (KR); Hyoung Jun Na, Seoul (KR)

(73) Assignee: SAP SE, Walldorf (DE)

( * ) Notice: Subject to any disclaimer, the term of this patent is extended or adjusted under 35 U.S.C. 154(b) by 346 days.

(21) Appl. No.: 15/589,740

(22) Filed: May 8, 2017

(65) Prior Publication Data

US 2018/0322156 A1 Nov. 8, 2018

(51) Int. Cl.
  *G06F 16/23* (2019.01)
  *G06F 9/46* (2006.01)
  *G06F 15/167* (2006.01)
  *G06F 16/21* (2019.01)

(52) U.S. Cl.
  CPC .......... *G06F 16/2322* (2019.01); *G06F 9/466* (2013.01); *G06F 15/167* (2013.01); *G06F 16/219* (2019.01); *G06F 16/23* (2019.01); *G06F 16/2308* (2019.01); *G06F 16/2343* (2019.01)

(58) Field of Classification Search
  CPC .... G06F 16/2322; G06F 16/219; G06F 16/23; G06F 16/2343; G06F 16/2308; G06F 9/466; G06F 15/167
  USPC ........................................................ 707/704
  See application file for complete search history.

(56) References Cited

U.S. PATENT DOCUMENTS

| | | | |
|---|---|---|---|
| 6,360,228 B1 * | 3/2002 | Sundara | G06F 16/2365 |
| 6,480,848 B1 | 11/2002 | DeKimpe et al. | |
| 7,305,421 B2 | 12/2007 | Cha et al. | |
| 8,442,962 B2 | 5/2013 | Lee et al. | |
| 8,700,660 B2 | 4/2014 | Lee et al. | |
| 8,768,927 B2 | 7/2014 | Yoon et al. | |
| 8,782,100 B2 | 7/2014 | Yoon et al. | |
| 8,793,276 B2 | 7/2014 | Lee et al. | |
| 8,918,436 B2 | 12/2014 | Yoon et al. | |
| 8,935,205 B2 | 1/2015 | Hildenbrand et al. | |
| 9,009,182 B2 | 4/2015 | Renkes et al. | |
| 9,037,677 B2 | 5/2015 | Lee et al. | |

(Continued)

OTHER PUBLICATIONS

Cha et al., "An Extensible Architecture for Main-Memory Real-Time Storage Systems", RTCSA : 67-73 (1996).

(Continued)

*Primary Examiner* — Evan Aspinwall
(74) *Attorney, Agent, or Firm* — Klarquist Sparkman, LLP

(57) ABSTRACT

Technologies are described for facilitating transaction processing within a database environment. A commit protocol provides for the atomic commit or rollback of a transaction that includes an operation that modifies a metadata entity of the database system and one or more other operations that modify metadata entities or data records of the database system. Innovations are provided for detecting and resolving deadlocks that may arise during transaction processing. Innovations are also provided for providing versioning of metadata entities, including invalidating metadata entities cached at a slave node during the commit at a master node of a transaction that creates a new version of the metadata entity.

60 Claims, 14 Drawing Sheets

(56) References Cited

U.S. PATENT DOCUMENTS

| | | | |
|---|---|---|---|
| 9,063,969 | B2 | 6/2015 | Lee et al. |
| 9,098,522 | B2 | 8/2015 | Lee et al. |
| 2003/0061537 | A1 | 3/2003 | Cha et al. |
| 2008/0065670 | A1 | 5/2008 | Cha et al. |
| 2009/0313311 | A1* | 12/2009 | Hoffmann ........... G06F 11/2094 |
| 2012/0084273 | A1 | 4/2012 | Lee et al. |
| 2012/0084274 | A1 | 4/2012 | Renkes et al. |
| 2012/0166407 | A1 | 6/2012 | Lee et al. |
| 2012/0167098 | A1 | 6/2012 | Lee et al. |
| 2013/0124475 | A1 | 5/2013 | Hildenbrand et al. |
| 2013/0166534 | A1 | 6/2013 | Yoon et al. |
| 2013/0166553 | A1 | 6/2013 | Yoon et al. |
| 2013/0166554 | A1 | 6/2013 | Yoon et al. |
| 2013/0275457 | A1 | 10/2013 | Lee et al. |
| 2013/0275467 | A1 | 10/2013 | Lee et al. |
| 2013/0275468 | A1 | 10/2013 | Lee et al. |
| 2013/0275550 | A1 | 10/2013 | Lee et al. |
| 2013/0290282 | A1 | 10/2013 | Faerber et al. |
| 2013/0304714 | A1 | 11/2013 | Lee et al. |
| 2014/0122439 | A1 | 5/2014 | Faerber et al. |
| 2014/0122452 | A1 | 5/2014 | Faerber et al. |
| 2014/0136473 | A1 | 5/2014 | Faerber et al. |
| 2014/0136788 | A1 | 5/2014 | Faerber et al. |
| 2014/0149353 | A1 | 5/2014 | Lee et al. |
| 2014/0149368 | A1 | 5/2014 | Lee et al. |
| 2014/0149527 | A1 | 5/2014 | Lee et al. |
| 2014/0156619 | A1 | 6/2014 | Lee et al. |
| 2014/0222418 | A1 | 8/2014 | Richtarsky et al. |
| 2014/0244628 | A1 | 8/2014 | Yoon et al. |
| 2014/0297686 | A1 | 10/2014 | Lee et al. |
| 2014/0304219 | A1 | 10/2014 | Yoon et al. |
| 2015/0074082 | A1 | 5/2015 | Yoon et al. |
| 2015/0149409 | A1 | 5/2015 | Lee et al. |
| 2015/0149413 | A1 | 5/2015 | Lee et al. |
| 2015/0149426 | A1 | 5/2015 | Kim et al. |
| 2015/0149704 | A1 | 5/2015 | Lee et al. |
| 2015/0149736 | A1 | 5/2015 | Kwon et al. |
| 2015/0178343 | A1 | 6/2015 | Renkes et al. |
| 2015/0242400 | A1 | 8/2015 | Bensberg et al. |
| 2015/0261805 | A1 | 9/2015 | Lee et al. |
| 2017/0220621 | A1* | 8/2017 | Colrain ............... G06F 11/0745 |

OTHER PUBLICATIONS

Cha et al., "An Object-Oriented Model for FMS Control", J. Intelligent Manufacturing 7(5): 387-391 (1996).
Cha et al., "Cache-Conscious Concurrency Control of Main-Memory Indexes on Shared-Memory Multiprocessor Systems", VLDB: 181-190 (2001).
Cha et al., "Efficient Web-Based Access to Multiple Geographic Databases Through Automatically Generated Wrappers", WISE : 34-41 (2000).
Cha et al., "Interval Disaggregate: A New Operator for Business Planning", PVLDB 7(13): 1381-1392 (2014).
Cha et al., "Kaleidoscope: A Cooperative Menu-Guided Query Interface", SIGMOD Conference : 387 (1990).
Cha et al., "Kaleidoscope Data Model for an English-like Query Language", VLDB : 351-361 (1991).
Cha et al., "MEADOW: A Middleware for Efficient Access to Multiple Geographic Databases Through OpenGIS Wrappers", Softw., Pract. Exper. 32(4): 377-402 (2002).
Cha et al., "Object-Oriented Design of Main-Memory DBMS for Real-Time Applications", RTCSA : 109-115 (1995).
Cha et al., "Paradigm Shift to New DBMS Architectures: Research Issues and Market Needs", ICDE: 1140 (2005).
Cha et al., "P*TIME: Highly Scalable OLTP DBMS for Managing Update-Intensive Stream Workload", VLDB: 1033-1044 (2004).
Cha et al., "Xmas: An Extensible Main-Memory Storage System", CIKM : 356-362 (1997).
Chang et al., "Bigtable: A Distributed Storage System for Structured Data," ACM Transactions on Computer Systems (TOCS), vol. 26, No. 2, p. 4, (2008).
Du et al., "Clock-SI: Snapshot Isolation for Partitioned Data Stores Using Loosely Synchronized Clocks," in Reliable Distributed Systems (SRDS), 2013 IEEE 32nd International Symposium on. IEEE, pp. 173-184 (2013).
Fekete et al., "Making Snapshot Isolation Serializable," ACM Transactions on Database Systems (TODS), vol. 30, No. 2, pp. 492-528 (2005).
Hwang et al., "Performance Evaluation of Main-Memory R-tree Variants", SSTD: 10-27 (2003).
Kim et al., "Optimizing Multidimensional Index Trees for Main Memory Access", SIGMOD Conference: 139-150 (2001).
Kung et al., "On Optimistic Methods for Concurrency Control," ACM Transactions on Database Systems (TODS), vol. 6, No. 2, pp. 213-226 (1981).
Lee et al., "A Performance Anomaly Detection and Analysis Framework for DBMS Development", IEEE Trans. Knowl. Data Eng. 24(8): 1345-1360 (2012).
Lee et al., "Differential Logging: A Commutative and Associative Logging Scheme for Highly Parallel Main Memory Databases", ICDE 173-182 (2001).
Lee et al., "High-Performance Transaction Processing in SAP HANA." IEEE Data Eng. Bull., vol. 36, No. 2, pp. 28-33 (2013).
Lee et al., "SAP HANA Distributed In-Memory Database System: Transaction, Session, and Metadata Management," in Data Engineering (ICDE), 2013 IEEE 29th International Conference on. IEEE, pp. 1165-1173 (2013).
Qiao et al., "On Brewing Fresh Espresso: Linkedin's Distributed Data Serving Platform," in Proceedings of the 2013 ACM SIGMOD International Conference on Management of Data. ACM, pp. 1135-1146 (2013).
Tu et al., "Speedy Transactions in Multicore In-Memory Databases," in Proceedings of the Twenty-Fourth ACM Symposium on Operating Systems Principles. ACM, pp. 18-32 (2013).
Yoo et al., "A Middleware Implementation of Active Rules for ODBMS", DASFAA : 347-354 (1999).
Yoo et al., "Integrity Maintenance in a Heterogeneous Engineering Database Environment", Data Knowl. Eng. 21(3): 347-363 (1997).
Lee et al., "SAP HANA Distributed In-Memory Database System: Transaction, Session, and Metadata Management," *Data Engineering (ICDE)*, 2013 IEEE 29th International Conference on. IEEE, 9 pages (2013).
"Variadic templates in C++," retrieved from http://eli.thegreenplace.net/2014/variadic-templates-in-c/, on or before Apr. 2017, 12 pages.
"Callback (computer programming)," retrieved from https://en.wikipedia.org/wiki/Callback_(computer_programming), on or before Apr. 2017, 7 pages.
"Data definition language," retrieved from https://en.wikipedia.org/wiki/Data_definition_language, on or before Apr. 17, 2017, 4 pages.
"What is DDL and DML," retrieved from http://stackoverflow.com/questions/2578194/what-is-ddl-and-dml, on or before Apr. 2017, 3 pages.
"Graph Databases—Templates," retrieved from http://www.cplusplus.com/doc/oldtutorial/templates/, on or before Apr. 2017, 4 pages.
"Class diagram," retrieved from https://en.wikipedia.org/wiki/Class_diagram, on ore before Apr. 2017, 8 pages.
"Introduction to C++ Variadic Templates," retrieved from http://kevinushey.github.io/blog/2016/01/27/introduction-to-c++-variadic-templates/, on or before Apr. 2017, 11 pages.
"Set Transaction Autocommit DDL Statement (Transaction Management)," retrieved from https://help.sap.com/viewer/4fe29514fd584807ac9f2a04f6754767/2.0.00/en-US/d538d11053bd4f3f847ec5ce817a3d4c.html, on or before Apr. 2017, 2 pages.
"Determining the current AUTOCOMMIT DDL setting," retrieved from http://stackoverflow.com/questions/38964362/determining-the-current-autocommit-ddl-setting, on or before Apr. 2017, 1 page.
"Multiversion concurrency control," retrieved from https://en.wikipedia.org/wiki/Multiversion_concurrency_control, on Jun. 14, 2018, 2 pages.
Extended European Search Report, EP App. No. 18170733.2, dated Jun. 25, 2018, 11 pages.

* cited by examiner

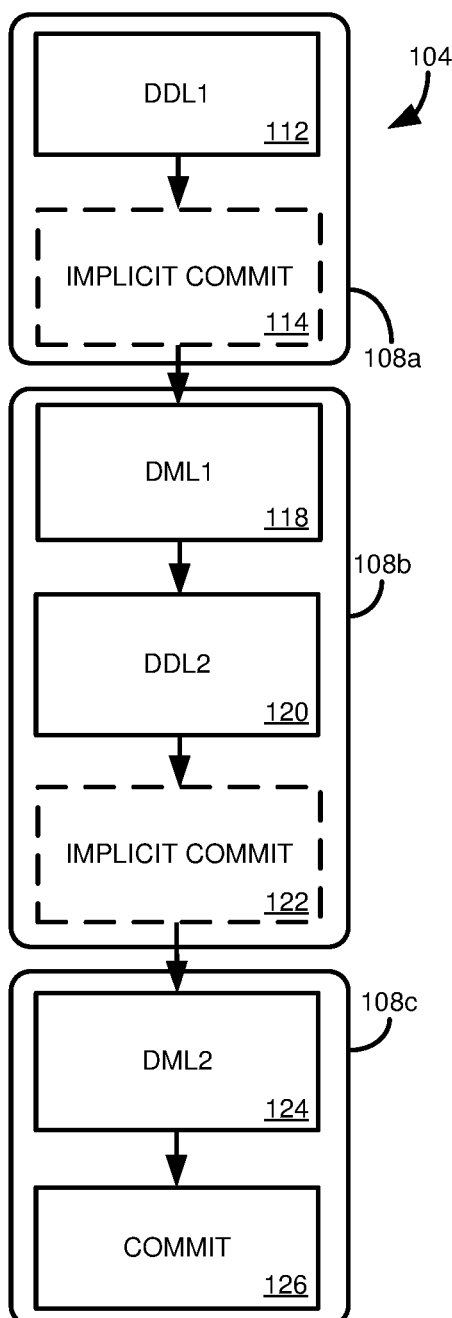
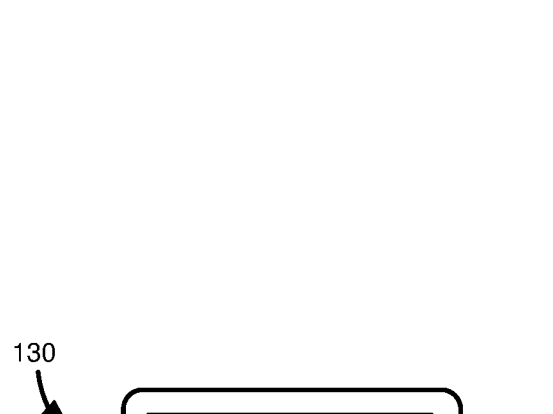
FIG. 1A
FIG. 1B

SOFTWARE 1480 IMPLEMENTING DESCRIBED TECHNOLOGIES

ATOMIC PROCESSING OF COMPOUND DATABASE TRANSACTIONS THAT MODIFY A METADATA ENTITY

FIELD

The present disclosure generally relates to processing database transactions that include multiple operations, where at least one of the operations modifies a metadata entity of the database system. Particular implementations can be carried out in a distributed database environment.

BACKGROUND

Database transactions typically include operations that read, create, or modify data in the database. These operations can be data manipulation language (DML) statements, such as DML statements in the structured query language (SQL). Typically, one or more DML statements are included in a transaction—a group of statements that are processed together as a unit. For instance, a user or application may sequentially specify multiple DML statements. If desired, the entire transaction can be committed, which ends the transaction and makes the results visible to other database clients (e.g., which read the database). In other cases, a user may wish to abort the transaction, without committing the statements, which can be carried out by a rollback operation.

Database transactions can instead include operations that affect metadata associated with the database, as opposed to database records. These operations can be data definition (or description) language (DDL) statements, such as DDL statements in SQL. DDL statements can specify operations such as creating a table, dropping a table, altering a structure of a table, creating of a table index, and creating database views. While multiple DML statements can be included in a single transaction, with or without a commit operation being carried out, typical database systems perform a commit operation after each DDL statement is executed. The commit operation may be implicit (e.g., not directly specified by a user or application).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for processing compound database transactions, those which include multiple operations (e.g., DML or DDL statements), where at least one of the operations modifies a metadata entity of the database system (e.g., a DDL statement). The processing includes the atomic commit or rollback of the transaction. For example, if the transaction is atomically committed, all of the operations in the transaction are made visible to other database clients at the same time, and can be associated with a common timestamp (e.g., a commit timestamp or identifier). In some implementations, when a metadata entity is modified or deleted, a new version of the metadata entity can be created, which can allow different database operations to view different versions of the metadata entity. When the database system is distributed between a master node and one or more slave nodes, when a new version of the metadata entity is committed, in the process of committing, versions of the metadata entity cached at slave nodes can be invalidated.

In one aspect, the disclosed innovations provide a method for atomically committing or aborting a transaction that includes a statement that modifies a metadata entity of the database system and one or more additional statements that modify metadata entities or database records of the database system. A transaction is initiated for a database client. In the transaction, a first statement is executed that modifies a metadata entity of the database system. At least a second statement is executed in the transaction. The at least a second transaction modifies a metadata entity of the database system or a database record of the database system. A request is received from a database client, such as an explicit request, to commit or abort the transaction. The transaction is atomically committed or aborted, as specified by the request.

In another aspect, the disclosed innovations provide a method for, in a distributed database environment, committing a database transaction that includes an operation to modify or delete a metadata entity of the database system. A database transaction is received that includes an operation to modify or delete a metadata entity of the database system. An updated version of the metadata entity is created. A version timestamp is assigned to the updated version. The version timestamp is sent to at least one of one or more worker nodes. The version timestamp invalidates a cached version of the metadata entity stored at the at least one worker node. The database transaction is committed.

In a further aspect, the disclosed innovations provide a method for committing a transaction that includes a DDL statement and one or more additional DDL or DML statements. A transaction is received from a database client that includes a first DDL statement and at least one of at least a first DML statement and a least a second DDL statement. The first DDL statement modifies or deletes a metadata entity of the database system. The metadata entity is a first version associated with a first version timestamp. A second version of the metadata entity is created in response to the first DDL statement. A second version timestamp is associated with the second version. The transaction is committed. The first and second versions are concurrently maintained for a time period.

The various innovations can be used in combination or separately. As described herein, a variety of other features and advantages can be incorporated into the technologies as desired. The foregoing and other objects, features, and advantages of the invention will become more apparent from the following detailed description, which proceeds with reference to the accompanying figures.

BRIEF DESCRIPTION OF THE DRAWINGS

FIG. 1A is a diagram schematically depicting operations in a database system where an implicit commit operation is carried out after the execution of every DDL statement.

FIG. 1B is a diagram schematically depicting operations in a database system where a DDL statement and at least one of another DDL statement and a DML statement can be included in a single transaction that is atomically committed when requested by a database client.

DETAILED DESCRIPTION

Example 1—Overview

Figure 2:
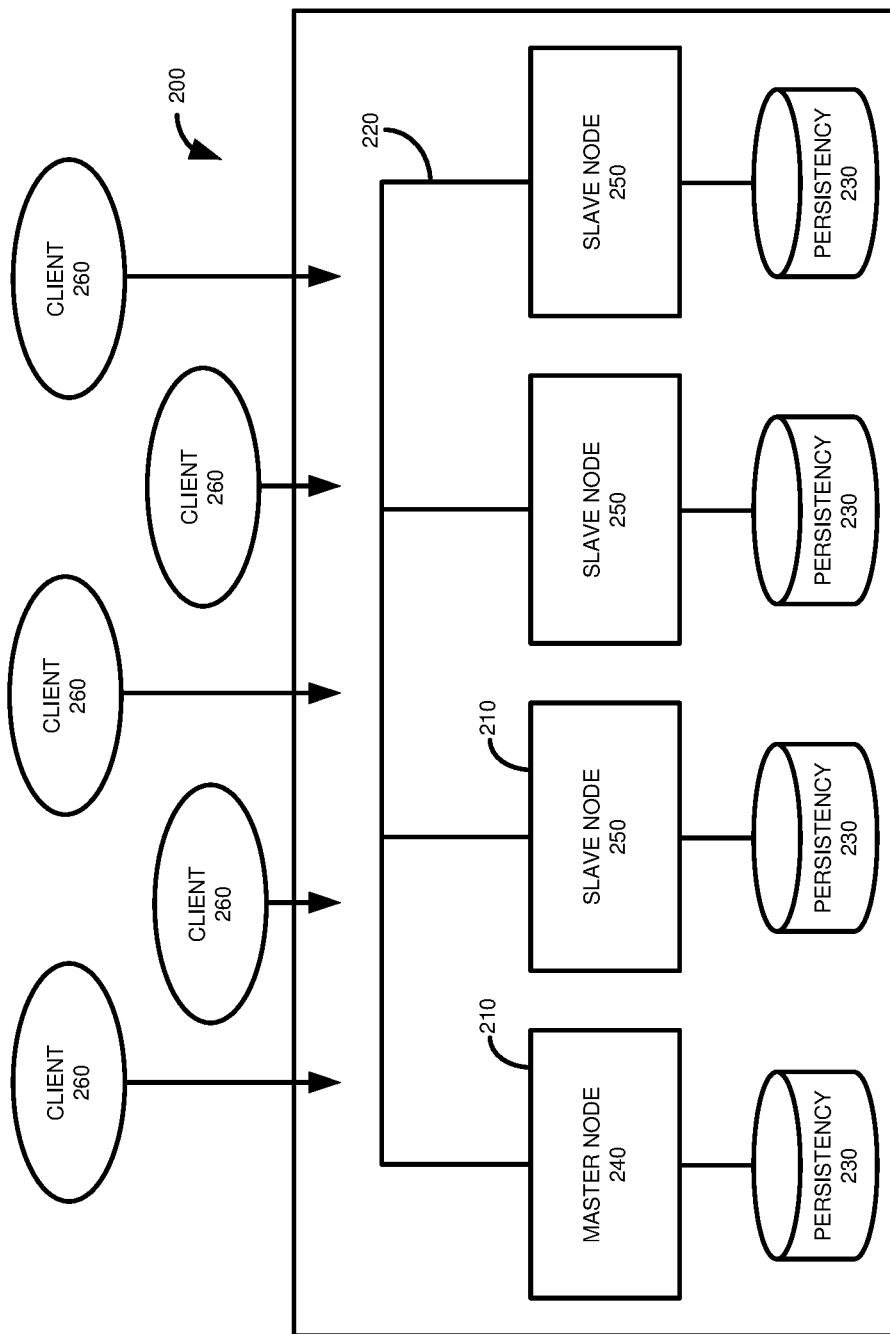
FIG. 2 is a diagram depicting a database environment having a coordinator node and a plurality of worker nodes in which at least certain disclosed innovations can be implemented.

Database transactions typically include operations that read, create, or modify data in the database. These operations can be data manipulation language (DML) statements, such as DML statements in the structured query language (SQL). Typically, one or more DML statements are included in a transaction—a group of statements that are processed together as a unit. For instance, a user or application may sequentially specify multiple DML statements. If desired, the entire transaction can be committed, which ends the transaction and makes the results visible to other database clients (e.g., which read the database). In other cases, a user may wish to abort the transaction, without committing the statements, which can be carried out by a rollback operation.

Database transactions can instead include operations that affect metadata associated with the database, as opposed to database records. These operations can be data definition (or description) language (DDL) statements, such as DDL statements in SQL. DDL statements can specify operations such as creating a table, dropping a table, altering a structure of a table, creating of a table index, and creating database views. While multiple DML statements can be included in a single transaction, with or without a commit operation being carried out, typical database systems perform a commit operation after each DDL statement is executed. The commit operation may be implicit (e.g., not directly specified by a user or application).

Performing a commit operation after each DDL statement can simplify database operation. However, it can also lead to undesirable behavior, or more complex requirements for applications and users interacting with the database system. For instance, a database client (e.g., a user or application) may intend to carry out multiple DDL statements, or a mixture of DDL statements and one or more DML statements. If multiple DDL statements are executed, the database system may not provide functionality to rollback all but the most recent DDL statement (because the earlier DDL statements caused an implicit commit operation, including a commit of any intermixed DML statements).

Thus, if an application is to provide functionality for rolling back multiple DDL statements, the application itself must implement rollback algorithms which can be complex. In many cases, rollback functionality is simply not provided. If an application does not provide for more complex rollback functionality, a user may need to manually carry out operations to restore a prior state of a database system, which can be complex, time consuming, and prone to errors. In some cases, an application may provide functionality to carry out certain operations (e.g., create an index), but not provide functionality to undo the operation (e.g., drop an index), or the user may have the knowledge to execute the original operations, but may not know the operations needed to restore the prior state of the database system.

Performing a commit operation after every DDL statement can cause additional issues. As explained above, performing a commit operation makes the committed statements visible to other database clients. If multiple DDL operations, and optionally one or more DML statements, are intended to be applied as a unit (e.g., the final result of multiple DDL statements made visible to other users), performing a commit operation after every DDL statement may make an "intermediate" state visible to other database clients, which may result in unexpected behavior, errors, or corrupted data. For instance, if a user intends to drop an existing index, modify the structure of the table, and create a new index, errors may result if another database client tries to use an index for the table after the old index was dropped and before the new index is created.

The present disclosure provides a database system that does not automatically perform a commit operation after a DDL statement is executed. In such cases, a commit operation can be performed when requested by a database client. In particular examples, the database system can operate in a mode where a commit operation is performed after every DDL statement and a mode where a commit operation is not performed after every DDL statement (e.g., it is performed when requested by a database client). A database client can be allowed to select which mode the database system operates in, or the mode can be selected by a database administrator.

In particular examples, the operational mode of the database system can be different for different clients. In further examples, the operational mode of the database system can be specified for a particular database session, or for particular transactions of a database system. For instance, the database system may operate in a default mode (e.g., automatically committing after every DDL statement), but the default mode can be overridden by associating a suitable command with a particular transaction. Unless otherwise specified, the database system can resume default operation after the transaction is complete (e.g., when the database client issues an explicit commit request or aborts the transaction).

The present disclosure provides innovations that can facilitate the operation of the database system in a mode where a commit operation is not automatically (including implicitly) performed after every DDL statement. According to one innovation, the present disclosure provides a visibility scheme such that all operations (e.g., DDL statements and DML statements) in a transaction are made visible in an atomic way, or are atomically aborted.

According to another innovation, the present disclosure provides for the creation of versions of metadata entities, and version control, to facilitate rollback of a transaction that includes multiple DDL statements (and optionally one or more DML statements) or to ensure that other database readers are provided with an appropriate version of a metadata entity. In addition, the disclosed innovations can provide methods for removing entity versions created as part of a transaction that is to be rolled back. In particular, the innovations can provide for rollback that is also atomic (e.g., all executed statements in the transactions are recorded and automatically rolled back when appropriate).

Enabling the atomic commit of multiple DDL statements can create the potential for deadlocks, as DDL statements typically acquire an exclusive table lock of the affected tables (or potentially multiple tables, such as in the case of a DDL statement relating to a database view), as opposed to DML statements, which typically only acquire record-level locks. Thus, the present disclosure also provides an innovative deadlock detection and deadlock handling scheme.

Implementing one or more of the disclosed innovations can provide advantages. For instance, by providing for the atomic commit of multiple DDL statements, database clients can rollback multiple DDL statements (including one or more intermixed DML statements) without a database application having to specifically provide appropriate rollback algorithms. The atomic commit of multiple DDL statements, optionally including intermixed DML statements, can allow database clients to carry out database operations to achieve an intended effect without the chance for other database clients accessing an intermediate version of the system. In particular, the disclosed innovations can allow a database client to make changes to the database system, test the system (e.g. performing queries or tests to determine whether the system is operating appropriately), modify records, or combinations thereof, before committing the changes and making them visible to other database clients. If the system is not operating appropriately, or the changes are otherwise desired to be undone, the disclosed innovations can facilitate rolling back the changes to resume a prior state of the database system. The deadlock detecting and handling scheme can prevent the database system from entering a deadlocked state.

Example 2—Example Atomically Committed Transaction Including a DDL Statement and One or More DDL or DML Statements FIG. 1A illustrates a sequence of operations 104 that may occur in a typical database commit protocol, where the database system automatically performs a commit operation, which can be an implicit (e.g., not directly requested or specified by a database client) commit, after every DDL statement is executed. The sequence 104 illustrates transaction boundaries 108 that result from such automatic commit operations. In the sequence 104, a first DDL statement is executed at 112, followed by an implicit commit operation 114. The operations occur within a first transaction boundary 108a. Once the implicit commit 114 is performed, the operations within the transaction boundary, DDL1, will become visible to other database clients.

A first DML statement is executed at 118, followed by a second DDL statement at 120. An implicit commit is carried out at 122, after the execution of DDL2. Operations 118 and 120 thus occur within the transaction boundary 108b, becoming visible to other database clients after the implicit commit at 122.

A second DML statement is executed at 124, followed by an explicit commit operation (e.g., in response to a specific commit request from a database client) at 126. DML2 is thus within transaction boundary 108c, and visible to other database clients after the explicit commit at 126.

Note that, in the sequence of operations 104, database operations become visible at three different times, even though a single explicit commit request was received from a database client. As explained above, a database client may intend that all of the operations 104 be within a single transaction boundary, and thus earlier visibility of the operations within the transactions boundaries 108a, 108b may result in unintended operation of the database system, as well as making rollback of all of the operations 104 more complex, or perhaps even preventing rollback.

FIG. 1B illustrates a sequence of operations 130 that may occur according an innovative protocol of the present disclosure. The operations 130 include database operations carried out as part of the operations 104. In particular, the operations 130 include the execution of a first DDL statement at 134, execution of a first DML statement at 136, execution of a second DDL statement at 138, and execution of a second DML statement at 140. An explicit commit request is received and executed at 142.

As opposed to the operations 104, the operations 130 do not include an automatic, or implicit, commit operation after the execution of each DDL statement. Thus, the operations 130 all occur within a single transaction boundary 146. Accordingly, all of the operations 130 become visible to other database clients in an atomic manner. As explained above, including the operations 130 in a single transaction boundary can be beneficial if, for instance, rather than committing the operations, the operations are to be rolled back.

Example 3—Distributed Database Environment

This Example 3 describes an example distributed database system that may be used with at least certain embodiments of the disclosed DDL commit protocol. FIG. 2 illustrates a database environment 200 having a plurality of database nodes 210 connected through a network 220. In a particular example, the network 220 is a high-speed/low-latency network. A host refers to a computing system having a processor and memory. A host may also be referred to a node. Unless the context clearly indicates otherwise, a node can refer to the host in a single host system (such a single worker node), or one of a plurality of hosts in a system (such as one of a plurality of worker nodes). Although this Example 3 depicts a distributed database environment 200, in other aspects, the innovations of the present disclosure can be used in a database system having a single host, such as a non-distributed database system.

As shown, each node 210 has its own persistency store 230. In some examples, one or more nodes 210 may have shared storage. In a particular example, such as for disaster recovery purposes, a remote instance of the system 200 can be configured to act as a hot standby cluster by continuously replaying logs shipped from the primary cluster 200.

The database nodes 210 are asymmetric, in some respects, since database node 240 has the role of a coordinator (or master) node and database nodes 250 function as worker (or slave) nodes. A coordinator node refers to a node (or host) that manages information regarding the coordinator node and one or more worker nodes. A worker node refers to a node that is installed on a different host than the coordinator node and has at least some of its activities or operations controlled or regulated by a coordinator node. Information managed by the coordinator node 240 can include the commit of database operations, such as DML or DDL statements. The coordinator node 240 can also serve as a master repository of at least certain types of information or data, such as metadata (e.g., the structure of the database system and metadata regarding database tables and database views).

The coordinator node 240 and the worker nodes 250 are in communication, such as through the network 220, and may send and receive communications to and from one another. As used herein, the term "send" to a destination entity refers to any way of transmitting or otherwise conveying data within a computer system or between two computer systems, whether the data is directly conveyed or through one or more intermediate entities. Similarly, the term "receive," such as to receive from a source entity, refers to the receipt of data within a computer system or between two computer systems, whether the data is received directly from the computer system of original transmission or received through one or more intermediate entities.

Although the coordinator node 240 stores tables and partitions, as do the worker nodes 250, the specific role of the coordinator node 240 is to act as a metadata master and a transaction coordinator for distributed transactions. For example, when a client 260 seeks to access metadata at a worker node 250, the worker node retrieves the corresponding metadata from the coordinator node 240 and caches it locally. The cached metadata for a specific database object will be valid until the next DDL (data definition language) transaction is committed for that particular database object. Furthermore, being the transaction coordinator, the coordinator node 240 decides about the commit of multi-node write transactions and mediates between the worker nodes 250 when they need to exchange transactional information with each other.

The database nodes 210 are symmetric, in other respects, as each node 210 has its own persistency store 230 for log and checkpoint files. From the perspective of a client 260, an application may connect to any of the database nodes 210 and execute arbitrary read and write transactions. Tables can be partitioned and distributed across multiple database nodes 210. If a table has partitions defined via hash or range predicates, then those partitions can be distributed and stored in different nodes 210.

Although a client 260 may connect to any of the database nodes 210, it could be sub-optimal to connect to one of them randomly, or in a round-robin fashion, because the query's required tables or partitions may reside in a node 210 different from its connected execution node 210. If a query's target database objects are located in a different node 210, then the query execution may need to involve node-to-node communication through the network 220, which can be expensive in terms of the delay and resources involved. To minimize this mismatch between the execution location and the data location, a number of strategies can be used in the system 200.

Client-side routing is one strategy that can be used to reduce delay and use of other resources. When a given query is compiled (e.g. prepareStatement( ) in the Java Database Connectivity (JDBC) API), its desired locations are cached at the database client library. The next execution of the compiled query (e.g. executePrepared( ) in JDBC) is then, transparently for the application, routed, such as being directly routed, to one of the desired locations. If a query's target table is partitioned and distributed, a single desired location of the query typically cannot be decided at query compilation time, but it can be decided at query execution time by evaluating the given arguments corresponding to the table's partitioning specification.

While client-side statement routing is an approach that changes the execution location to resolve the execution/data location mismatch, it is also possible to change the data location by moving tables or partitions into a different location. The relocation may be triggered by the database administrator or automatically by an advisor tool, such as based on monitoring statistics of a given workload. Alternatively, tables can be co-partitioned in view of particular workload or database schemas in order to avoid expensive multi-node joins.

It is also possible to resolve the execution/data location mismatch by selectively replicating or caching tables/partitions. For example, if a join between two tables reflects a typical query pattern, replicating or caching the less-update-intensive table, or the smaller table, or both at a node, may improve system performance.

The disclosed innovations, including the disclosed DDL commit protocol, can provide strong transaction consistency, which can be particularly useful for applications where weakened consistency would not be desirable. In at least some implementations, the disclosed innovations can comply with ACID properties and provide the same, or at least substantially the same, transactional consistency independently of whether the underlying database is distributed or not.

Regarding the property isolation of the four properties in ACID, at least some database environments of the present disclosure can provide one or both of two variants of snapshot isolation, statement-level snapshot isolation (SSI) and transaction-level snapshot isolation (TSI). Snapshot isolation provides non-blocking read access against any concurrent write transactions.

If a transaction consists of one or more statements (such as DML or DDL statements), which can be, for example, either of read and write (e.g. INSERT, UPDATE, or DELETE), in SSI, each statement reads data from a snapshot of the committed data at the time the statement started. In TSI, each transaction reads data from a snapshot of the committed data at the time the transaction started, called the snapshot timestamp. In at least some database environments, SSI and TSI can co-exist, such as being configurable on a per user connection. The definitions of SSI and TSI imply that data once read, in a statement or a transaction respectively, should be visible again within the same statement or transaction even though the data has been changed by a different concurrent transaction. For example, when executing a join query with some predicate, the same record can be visited multiple times within a single statement scope since the intermediate result of a query operator can be passed to the next query operator by a set of references to the filtered records (e.g. row IDs) without necessarily fully materializing them. The innovations of the present disclosure extend these concepts of snapshot isolation (including one or both of SSI and TSI) to transactions that include multiple DDL statements or a mixture of one or more DML statements and one or more DDL statements.

Although a Write Skew anomaly can happen under snapshot isolation, where two transactions concurrently read overlapping data, make disjoint updates, and commit, it typically can be avoided in practice by using SELECT FOR UPDATE properly in applications. Contrasted to other concurrency control options like optimistic concurrency control or two-phase locking, a benefit of snapshot isolation is that read queries can proceed without any query abort or any lock waiting situation, even though they read a database object which is being changed by other transactions.

In some implementations, the disclosed transaction protocol, that does not automatically perform a commit operation after a DDL statement, can have additional characteristics. For example, the protocol can provide improved performance for both read-oriented workloads and read/write-mixed workloads. Although optimistic concurrency control can perform acceptably for some read-oriented workloads, it can lead to a high abort ratio for applications which generate concurrent read and write transactions.

Typically, in SSI and TSI, a snapshot timestamp is assigned to a new snapshot when the new snapshot starts. Under SSI, each statement has its own snapshot, while each transaction has its own snapshot under TSI. The cost of the snapshot timestamp assignment operation typically becomes more significant in SSI than in TSI, because the snapshot timestamp is assigned for each transaction under TSI, but for each statement under SSI. SSI thus offers more room for optimizations within the database kernel, because it can be known which tables or partitions need to be accessed in that particular snapshot scope by looking up the statement's query plan before actually executing it.

Another characteristic is that the cost of transaction control operations, such as snapshot timestamp assignment or transaction commit, may become more important for local statements/transactions than multi-node global statements/transactions due to their relative impact on overall performance. When a query touches tables distributed to multiple nodes, the query's execution time involves the network cost of exchanging the intermediate execution result of a node, thus the increase in the transaction control operations could be relatively trivial. However, if a query does not need to involve any network interaction for its own query processing, then a network roundtrip added only for the transaction control operation, for example, can affect the overall performance significantly. Typically, a large fraction of simple, but highly concurrent, queries (as typically observed in OLTP applications), run as single-node local queries. For example, in a multi-tenant database, tables can be partitioned reasonably well by tenant ID, leading naturally to node-local query execution.

In some aspects of the present disclosure, a database environment incudes a table having database records. A new version of a record is created on each update operation instead of overwriting the existing record version. Even for record deletion operations, a new version header is typically created with an empty payload instead of deleting the existing record right away. When creating a new record version, a versioning token, such as a version timestamp, representing the version creation time, is stored, such as in a version header. In a particular implementation, the version timestamp is derived from a global synchronization token, such as a transaction commit timestamp, maintained by a central transaction manager (which may be, for example, the coordinator node 240 of FIG. 2) which will be incremented on each commit of a write transaction (or in at least some cases, on the commit of a transaction that includes a DDL statement).

According to a particular example, the versions of a single record are chained to each other in a sorted order, such as by their version timestamps. Older versions in the version chain can be garbage-collected when specified criteria are met, such as when it is determined that there is no potential reader in the system for that record version. In a particular implementation, there being no potential reader in the system can be detected by maintaining a minimum value of snapshot timestamps of active snapshots in the system and comparing it with the version timestamps of the garbage candidates.

When a query tries to read a record version, the visibility of the record is checked by comparing the query's snapshot timestamp with the version timestamp of the candidate record version. If the version timestamp of the record is higher than the snapshot timestamp of the query, the particular record version should typically not be visible to the query because the created version of the record was committed after the query started. Otherwise, if the version timestamp of the record is not higher than the snapshot timestamp of the query, the record version should typically be visible to the query.

One potential issue in snapshot isolation implementation is updating version timestamps of multiple different rows in a transaction with the transaction's assigned commit timestamp in an atomic way. At version creation time, the embracing version timestamp can typically be correctly and finally set only after the embracing write transaction receives its commit timestamp within the commit procedure. However, if the versions of the write transactions are updated with their commit timestamp one by one, then some of those versions could be visible to another snapshot while the others might still be invisible. Such an outcome would not fully comply with the atomicity rule in the ACID properties.

To avoid this potential anomaly concerning visibility atomicity, a transaction context is maintained for each write transaction. When a write transaction starts its first write operation, a transaction context entry is created. In a particular example, all created row versions store a pointer to the transaction context entry in their version header field. At commit time, the transaction context entry is updated with the write transaction's commit timestamp, and thus is available to the other versions through the pointer to the transaction context entry. After the transaction commit processing is completed, the commit timestamp written in the transaction context entry is asynchronously propagated to the version timestamp fields. The transaction context entry may then be garbage-collected. With this atomic indirect commit timestamp assignment to the created versions, visibility atomicity is still facilitated under this snapshot isolation implementation.

Figure 3:
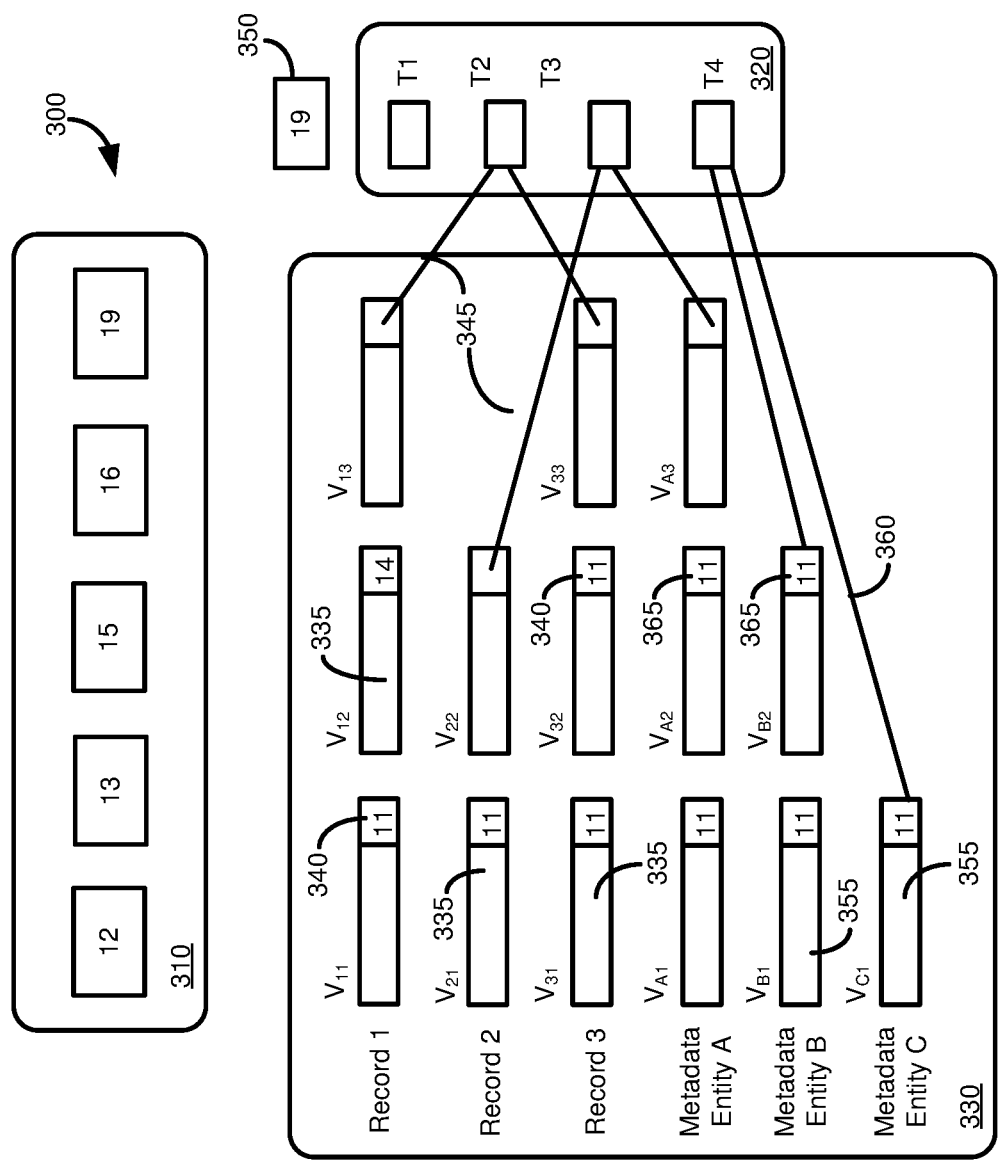
FIG. 3 is a diagram schematically illustrating how multiple versions of database records and metadata entities can be maintained and associated with version information.

FIG. 3 depicts an architecture 300 illustrating a transaction context providing version space management. The architecture 300 includes a snapshot timestamp store 310 that stores five active timestamps 12, 13, 15, 16, and 19. Architecture 300 further includes a transaction context store 320 for four active transactions, T1, T2, T3, T4, each with their own transaction context entry. The transactions can include DDL statements, write statements (e.g., DML statements), and combinations thereof. A version chain store 330 holds three database records, Record 1, Record 2, and Record 3, each with own version chain of record versions 335. Each record version 335 includes a version timestamp 340.

As shown, from the viewpoint of a snapshot whose snapshot timestamp is 12, $V_{11}$ and $V_{21}$ are visible (because their version timestamps are less than the snapshot timestamp) but the other record versions 335 are not. $V_{13}$, $V_{22}$, and $V_{33}$ do not have their version timestamps yet, because their write transactions are not yet committed. Under this transaction state, the record versions 335 store a pointer 345 to the corresponding transaction context entries (T2 and T3). Once T2, for example, commits, then the transaction commit timestamp (19, as shown) of a transaction manager 350 at that time is copied to the transaction context entry of the transaction context store 320, thus indirectly providing visibility atomicity. Note that the data structures in FIG. 3 are provided to give a conceptual overview, but their actual implementation can be different. For example, depending on whether the corresponding table is a row store or a column store, both of which may be supported in a single database system, the storage layout of the record versions may be different.

The innovations of the present disclosure extend versioning to metadata entity versions 355. Metadata entities can include definitions for tables, definitions for database views, table indices, and other types of metadata entities. The version store 330 can store the metadata entity versions 355, which can be similar to the record versions 335. Each metadata entity version 355 can be associated with a pointer 360 to a corresponding transaction context entry of the transaction context store 320. When the transaction associated with a metadata entity version 355 commits, the commit timestamp of the transaction manager 350 is copied to the transaction context entry of the transaction context store 320, which, through the pointers 360, are assigned as the version identifiers 365 for the metadata entity versions. With this atomic indirect commit timestamp assignment to the created versions, under this snapshot isolation implementation, visibility atomicity is facilitated for compound transactions that include at least one DDL statement.

As shown in FIG. 3, each transaction context entry of the transaction context store 320 can be associated with one or more database record versions 335, one or more metadata entity versions 355, or a combination of one or more record versions and one or more metadata entity versions. Because the record versions 335 and the metadata entity versions 355 include pointers 345, 360 to the corresponding entry in the transaction context store, updating the context entry of the transaction context store 320 can provide atomic visibility for changes made to database record versions 335 and/or metadata entities 355.

Although read statements do not acquire locks in at least certain implementations of the present disclosure, a write transaction typically acquires an exclusive lock of its updated record to ensure a serializable schedule of concurrent write operations. If the latest version of the record is not visible to the snapshot after the exclusive record lock is acquired, then a transaction under TSI may throw an error to the end user. A statement under SSI, however, may be configured to restart the statement by substituting its statement timestamp with a newer value of the transaction commit timestamp. In at least certain examples, database objects are finally updated after lock acquisition and validation. In further examples, lock tables are partitioned according to the location of their corresponding tables, or partitioned together with a multi-node deadlock detection implementation, to detect when dependencies between write operations carried out at different nodes prevent transaction commitment.

DDL statements typically acquire exclusive locks of their affected tables. Accordingly, particularly when multiple transactions are being executed concurrently by multiple users, the potential for deadlocks can arise. As will be further discussed, the present disclosure provides innovations for detecting and handling deadlocks that may arise using the disclosed commit protocol that does not automatically carry out a commit operation after the execution of a DDL statement.

The creation of the versions 335, 355 can increase the storage or memory use of the database system. If desired, record versions 335 or metadata entity versions 355 can be periodically garbage-collected. For instance, when there is no longer any reader in the database system that can read a version, that version can be deleted.

Example 4—Example Record and Metadata Entity Version Creation

Figure 4:
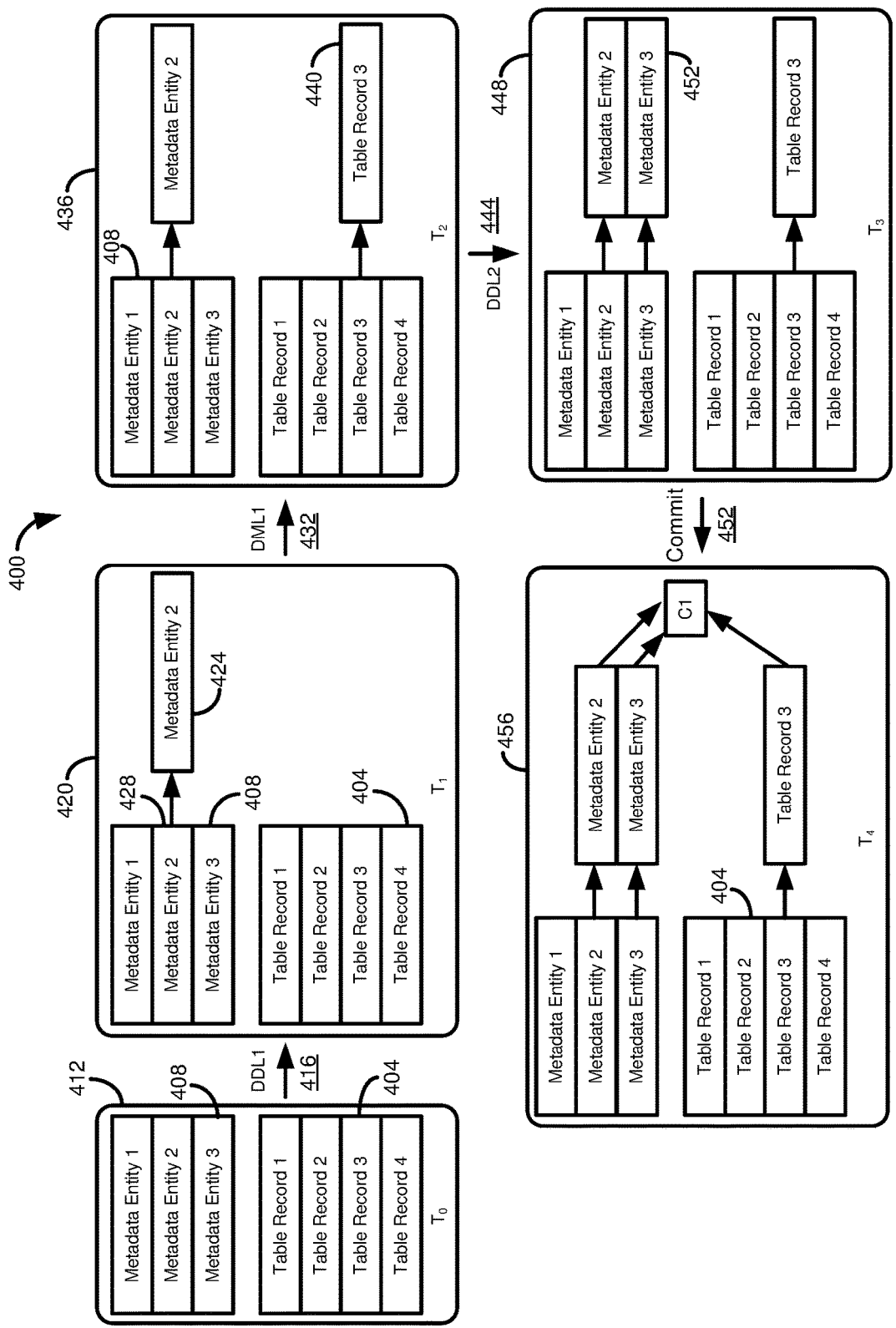
FIG. 4 is a diagram schematically depicting how to versions of metadata entities and database records can be created during a transaction, and each of the versions can be assigned a common timestamp in an atomic manner when the transaction is committed.

FIG. 4 illustrates example operations in a transaction 400 that includes multiple DDL statements and a DML statement, illustrating how the disclosed innovations can provide versioning of both table records 404 and metadata entities 408. State 412 represents an initial state, To, of the database system, having three metadata entities 408 and four table records 404.

A first DDL statement is executed at 416, providing the database state 420 at a time $T_1$. The DDL statement modified Metadata Entity 2. A new version 424 of Metadata Entity 2 is produced, while the prior version 428 of Metadata Entity 2 is maintained, at least for a period of time. Maintaining the prior version of Metadata Entity 2 (and, more generally, maintaining versions of table records 404 and metadata entities 408) can be useful both in the event operations in a transaction are to be aborted or rolled back (e.g., before a commit identifier, such as a timestamp, is assigned), or if there are database operations (e.g., queries or write operations) that have been assigned a snapshot timestamp for which a prior version of a table record or a metadata entity should be visible (e.g., after a commit identifier, such as a timestamp, has been assigned).

A first DML statement is executed at 432, providing a database state 436 at time T2. The first DML statement results in the creation of a new version 440 of Table Record 3. A second DDL statement is executed at 444, providing a database state 448 at time T3, and having a new version 452 of Metadata Entity 3.

A commit request, such as an explicit commit request from a database client, is executed at 452, providing the database state 456 at time T4. In state 456, the new versions of Metadata Entity 2 (424), Metadata Entity 3 (452), and Table Record 3 (440) are associated with a commit timestamp C1. The commit timestamp C1 can be used to decide whether the new versions of the metadata entities 408 and table records 404 should be visible to other database clients. That is, although the new versions can be visible to other database clients, they are typically only visible to operations of the other database clients associated with a snapshot timestamp that is greater than or equal to C1.

Example 5—Distributed Snapshot Isolation

As described above, in some cases, the disclosed innovations, including a commit protocol that does not automatically perform a commit operation after the execution of a DDL statement, can be carried out in a distributed database environment, having a master (or coordinator) node and one or more slave (or worker) nodes. This Example 5 describes situations that can arise in distributed transaction processing, and also describes aspects of the present disclosure that may be used in addressing such situations. Table 1 provides a set of symbols that may be used to describe a distributed transaction protocol.

TABLE 1

Notations

| Symbol | Description |
| --- | --- |
| CTS | Transaction commit timestamp of a transaction manager, incremented when a write transaction commits |
| GCT | CTS at the coordinator node |
| $LCT_i$ | CTS at a worker node i |
| $CID(T_i)$ | Commit ID of a write transaction $T_i$, assigned from GCT or LCT when $T_i$ commits |
| $pCID(T_i)$ | Precommit ID of a write transaction $T_i$, assigned from GCT or LCT when $T_i$ precommits |
| $Status(T_i)$ | Status of a write transaction $T_i$, either of {Unused, Active, Precommitted, Committed, Aborted} |
| $TID(T_i)$ | Transaction identifier of a transaction $T_i$ |
| STS(Si) | Snapshot timestamp of a snapshot $S_i$, assigned from GCT or LCT when the snapshot (statement or transaction) starts |

In at least certain implementations, disclosed innovations can provide the same level of transactional consistency regardless of how many nodes the database is partitioned into. For example, a database environment may evolve from a single-node system to a multi-node distributed system, such as to handle higher workloads or larger database volumes. It may be undesirable for users to change their own application logic and adapt it for a potentially weaker consistency level provided by the database engine. This Example 5 describes two consistency properties of distributed database environments that can be addressed by at least certain disclosed innovations.

According to the principle of visibility atomicity, a transaction's changes should be visible to another concurrent snapshot in an atomic way: either completely visible or not. Achieving visibility atomicity under snapshot isolation in a distributed database environment can be difficult because the record versions created by a write transaction and, in some cases, record versions for DDL statements, can be distributed across the nodes. For example, for a multi-node write transaction, if each updated node is committed one by one, then the changes of a node can be visible earlier to another concurrent reader, but others may not be visible to the same reader. In the case of the innovative commit protocol disclosed herein, a transaction may include one or more of distributed write operations, a DDL statement for a table that is partitioned across multiple nodes, or DDL statements for tables located at different nodes (e.g., for a database view involving tables located at different database system nodes).

Figure 5:
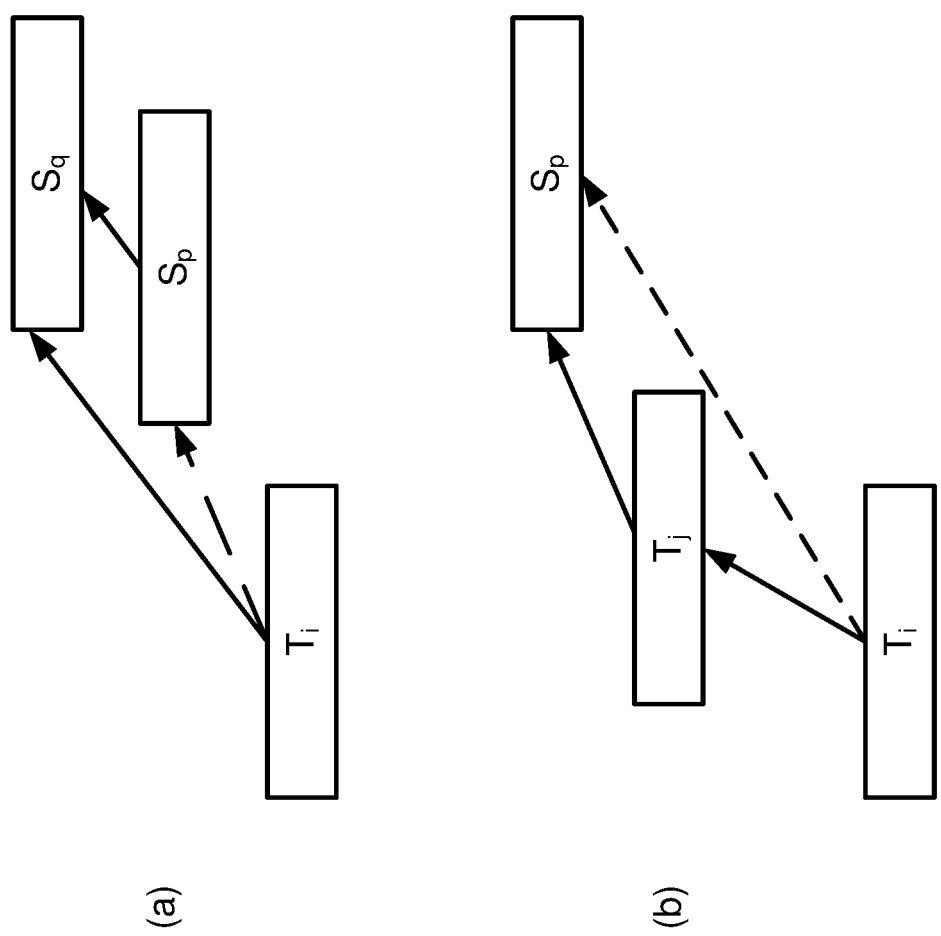
FIG. 5 is a diagram illustrating properties of snapshot monotonicity that may be provided by at least certain disclosed innovations with reference to an arbitrary pair of snapshots and an arbitrary pair of transactions.

According to the principle of snapshot monotonicity, a transaction protocol is said to ensure snapshot monotonicity if all of the following conditions (visually represented in FIG. 5) are met for an arbitrary pair of transactions (having a DDL statement and at least one of one or more additional DDL statements and one or more DML statements) including at least one distributed database operation, $T_i$ and $T_j$, and an arbitrary pair of snapshots, $S_p$ and $S_q$:
  If $T_i$'s changes were visible to $S_q$, and $S_q$ was started after $S_p$'s start, then $T_i$'s changes should be visible to $S_p$ as well (FIG. 5(*a*)).
  If $T_i$'s changes were visible to $S_p$, and $T_j$ committed after $T_i$'s commit, then $T_i$'s changes should be visible to $S_p$ as well (FIG. 5(*b*)).

Snapshot monotonicity is not represented by traditional ACID property definitions. However, it is a feature that may be appreciated by users. For example, assume a SalesOrder processing component in a business application inserted a record into a database table Tab1 by using a transaction $T_1$, and then it notified the event to a SupplyAvailabilityCheck processing component via a messaging protocol inside an application server after $T_1$ is committed. The SupplyAvailabilityCheck processing component then inserts a new record into a table Tab2 by using another transaction T2. Then, it will be expected that the inserted record by SalesOrder processing (into Tab1 by $T_1$) should be visible to an analytic query which joins the tables Tab1 and Tab2 if the inserted record by SupplyAvailabilityCheck processing (into Tab2 by $T_2$) was visible to the join query.

For visibility atomicity of multi-node transactions, certain aspects of the present disclosure provide a delayed visibility decision scheme that employs an in-doubt visibility state of record versions and metadata entity versions. The visibility in-doubt state means that the write operation of the target record versions or the DDL operation started its commit processing but is not yet finished. Under this state, the visibility to a given snapshot is not immediately decided, but postponed until the transaction state is marked as committed. The in-doubt state results in the sub-operations being effectively atomic without relying on any latch or lock.

Example 6—Snapshot Management

Algorithm 1 shows how a statement checks if a record version or metadata entity version V should be visible or not to a snapshot S (a statement under SSI or a transaction under TSI). For the visibility decision, first, V's creator transaction's state is checked. If it is aborted or active, then V should not be visible to S (lines 8 to 11). If it is committed, then V's CID is compared to STS(S). V is visible to S only if STS(S) is equal to or larger than V's CID (lines 3-7).

| Algorithm 1 Visibility decision algorithm: check if a record version V should be visible to a snapshot S or not |
| --- |
| 1:     while TRUE do |
| 2:         if V's status is Committed then |
| 3:             if V's CID ≤ STS(S) then |
| 4:                 return TRUE |
| 5:             else |
| 6:                 return FALSE |
| 7:             end if |
| 8:         else if V's status is Aborted then |
| 9:             return FALSE |
| 10:        else if V's status is Active then |
| 11:            return FALSE |
| 12:        else if V's status is Precommitted then |
| 13:            if V's pCID ≥ STS(S)then |
| 14:                return FALSE |
| 15:            else |
| 16:                 wait until V's status becomes Committed or Aborted |
| 17:            end if |
| 18:        end if |
| 19:     end while |

In addition to the basic visibility rules, the following extensions are provided. As previously mentioned, and as recited in Algorithm 1, at least certain implementations provide a statement or transaction status of being precommitted, where the final commitment of the statement or transaction is treated as in-doubt, with the visibility decision being delayed until the in-doubt status has been resolved, such as by the statement or transaction being committed. If V's status is precommitted (lines 12 to 17), the corresponding record version's visibility decision is postponed. The precommitted/in-doubt state makes sub-operations of a transaction commit effectively atomic without relying on any latch or lock.

The delayed visibility decision scheme may result in a situation where a read statement may need to wait for another write transaction's or DDL statement's commit to be completed. However, this waiting situation is typically uncommon, because it happens when a read statement is trying to check the visibility of a record version which was created by a write transaction committed at the same time as the read attempt. To further reduce the possibility of a reader waiting for an in-doubt transaction to complete, particular implementations of the disclosed transaction management protocol can include early pruning of record versions that will never be visible.

As explained above, the in-doubt period of a transaction is started by setting the transaction's state as precommitted. By assigning pCID, which is typically defined to be smaller than its CID value to be decided later, at the time when the transaction state is set as precommitted, record versions which will never be visible to the pending reader statement, such as because the query was started later than the write or DDL operation and thus should only view records that were available when the query was started, can be pruned. More specifically, if STS(S) is smaller than or equal to pCID(T) for a write or DDL operation T and a snapshot S, then STS(S) will also be smaller than CID(T) because pCID(T) is smaller than CID(T) assigned by the commit protocol. Thus, if STS(S)≤pCID(T), it can be determined that the tested version V is not visible to S (lines 13 to 14 of Algorithm 1) without waiting any further.

In at least certain implementations of the present disclosure, garbage collection is executed independently in each worker node, but it considers not only the queries running in its local node, but also multi-node queries which were started at different worker nodes but can potentially access the local node. In order to reflect such global queries during local garbage collection, the coordinator node maintains all the active global queries by watching incoming StartGlobalSnapshot calls and EndGlobalSnapshot calls. When local garbage collection starts at a worker node, it gets the minimum STS value of active global queries, called MinActiveGlobalSTS, from the coordinator node, and also the minimum STS value of its active local queries, called minActiveLocalSTS, from its local node. Taking the minimum value of MinActiveGlobalSTS and MinActiveLocalSTS, the garbage collector finds out the record versions that have version timestamps which are smaller than the minimum value by traversing the record version chains. Or stated another way, versions of table records and versions of metadata entity can be deleted when there is no longer any potential reader for the version.

Example 7—Example Multi-Node Transaction Commit Protocol

Figure 6:
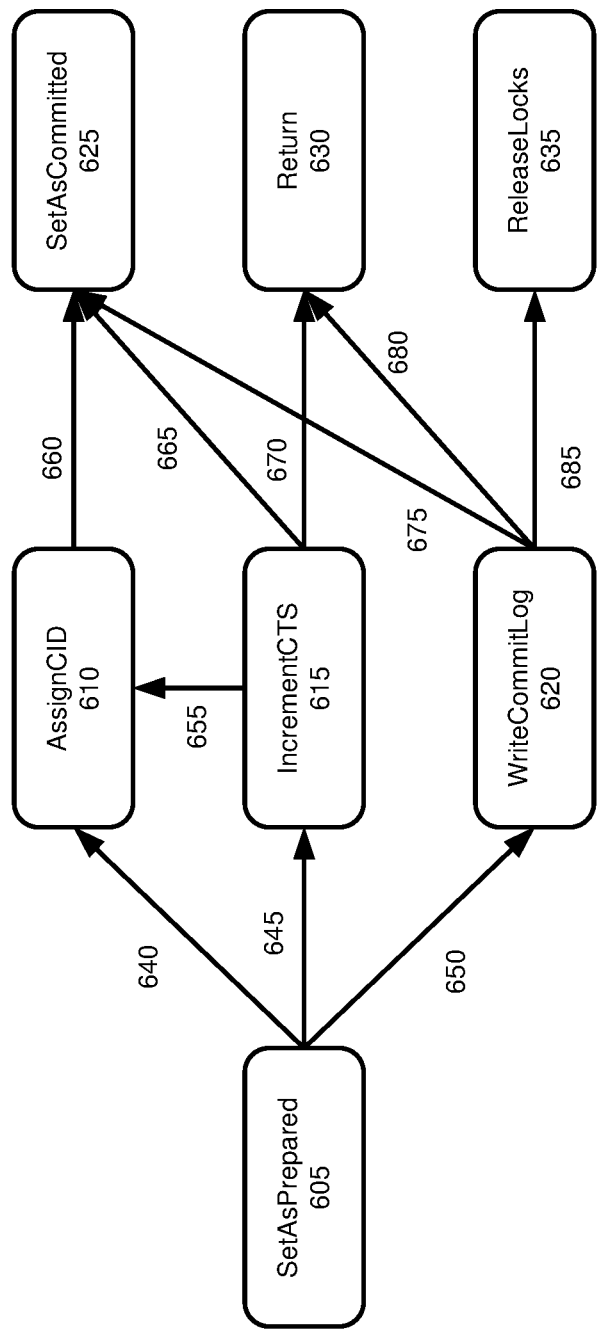
FIG. 6 is a diagram illustrating an operation ordering that may be used with a least certain disclosed innovations.

This Example 7 describes a transaction commit protocol according to an embodiment of the present disclosure, which may have different implementations depending on the transaction type. Commit protocols according to the embodiment of the present disclosure have a common set of sub-operations (Table 2) and employ the same ordering rules among those sub-operations (FIG. 6).

TABLE 2

| Sub-operations of transaction commit | |
| --- | --- |
| ID | Description |
| SetAsPrepared | Set the transaction's status as precommitted |
| IncrementCTS | Increment GCT or LCT depending on where it commits |
| AssignCID | Assign the transaction its CID value and associate it with the transaction's created record versions |
| WriteCommitLog | Write the transaction's commit log to persistent storage |
| SetAsCommitted | Set the transaction's status as committed |
| ReleaseLocks | Release all the write locks acquired by the transaction |
| Return | Acknowledge the completion of the transaction's commit to the client which requested it |

A write or DDL operation's status becomes precommitted by SetAsPrepared until SetAsCommitted is called later for the transaction. As previously mentioned, this in-doubt state can be used by the delayed visibility decision scheme to help ensure the atomicity of IncrementCTS and AssignClD of a write or DDL operation without relying on any latching or locking during transaction commit processing. When IncrementCTS is called, GCT or LCT is incremented depending on which type of node it commits Based on the new GCT or LCT value, the transaction's CID is decided at AssignClD. When WriteCommitLog is called, the write or DDL operation generates a commit log entry and writes it to persistent storage, then calls SetAsCommitted that sets the transaction's status as committed, and then calls ReleaseLocks, which releases all the locks acquired by the transaction. If SetAsCommitted is finished, the transaction's created record versions (e.g., table record versions or metadata entity versions) can be potentially visible to other readers. If ReleaseLocks is finished, then the transaction's changed records can be potentially changed again by other writers or DDL operations. Note that, following the multi-version concurrency control approach, a write operation of a transaction acquires a write lock on the changed record, and DDL operations acquire exclusive table locks, but read operations do not acquire any lock. Finally, at Return, the transaction's commit is acknowledged to the client which requested it.

Among those suboperations, a predefined execution order is typically maintained to help ensure transactional consistency, which is shown in FIG. 6. For operation boxes 605, 610, 615, 620, 625, 630, 635, arrows 640, 645, 650, 655, 660, 665, 670, 675, 680, 685 indicate that the operation at the tail end of the arrow should be executed before the operation at the head of the arrow.

The execution order 675, between WriteCommitLog 620 and SetAsCommitted 625, and the execution order 680 between WriteCommitLog 620 and Return 630, should typically be maintained in order to help provide snapshot monotonicity. Otherwise, snapshot monotonicity may not occur, because once visible data might not be visible any more after crash restart. Execution order 685, between WriteCommitLog 620 and ReleaseLocks 635, should also typically be maintained, as it provides two-phase locking. Otherwise, uncommitted data can be changed again by another transaction, potentially leading to a cascaded rollback problem.

Without maintaining execution order 660, between AssignCID 610 and SetAsCommitted 625, a record version that should be visible to a query may not be visible because the CID assignment to the record version is not yet finished. Without execution order 665, between IncrementCTS 615 and SetAsCommited 625, and execution order 670, between IncrementCTS 615 and Return 630, commit-marked or commit-informed data might not be visible even to its next query of the same session because the next query may start with a smaller snapshot timestamp value than the previously committed transaction's CID value.

Execution order 655, between IncrementCTS 615 and AssignCID 610, also helps provide snapshot isolation. For example, if IncrementCTS 615 is performed after AssignCID 610, a query that started before a transaction T1's IncrementCTS 615 operation could see T1's changes later because the STS value assigned to the query could be identical to T1's CID value. SetAsPrepared 605 should typically be executed before WriteCommitLog 620 (transaction order 650) as well as before IncrementCTS 615 and AssignCID 610 (execution orders 645 and 640, respectively), since these two suboperations should be made effective for other transactions in an atomic way. For example, if IncrementCTS 615 is completed, but AssignCID 610 is not yet finished for a write or DDL operation T1, then a different reader statement S1 can have STS(S1)>=CID(T1). However, since T1 does not yet have any CID, S1 can interpret T1's created versions as invisible but suddenly they will become visible when T1 finishes AssignCID, which will violate snapshot isolation.

Figure 7:
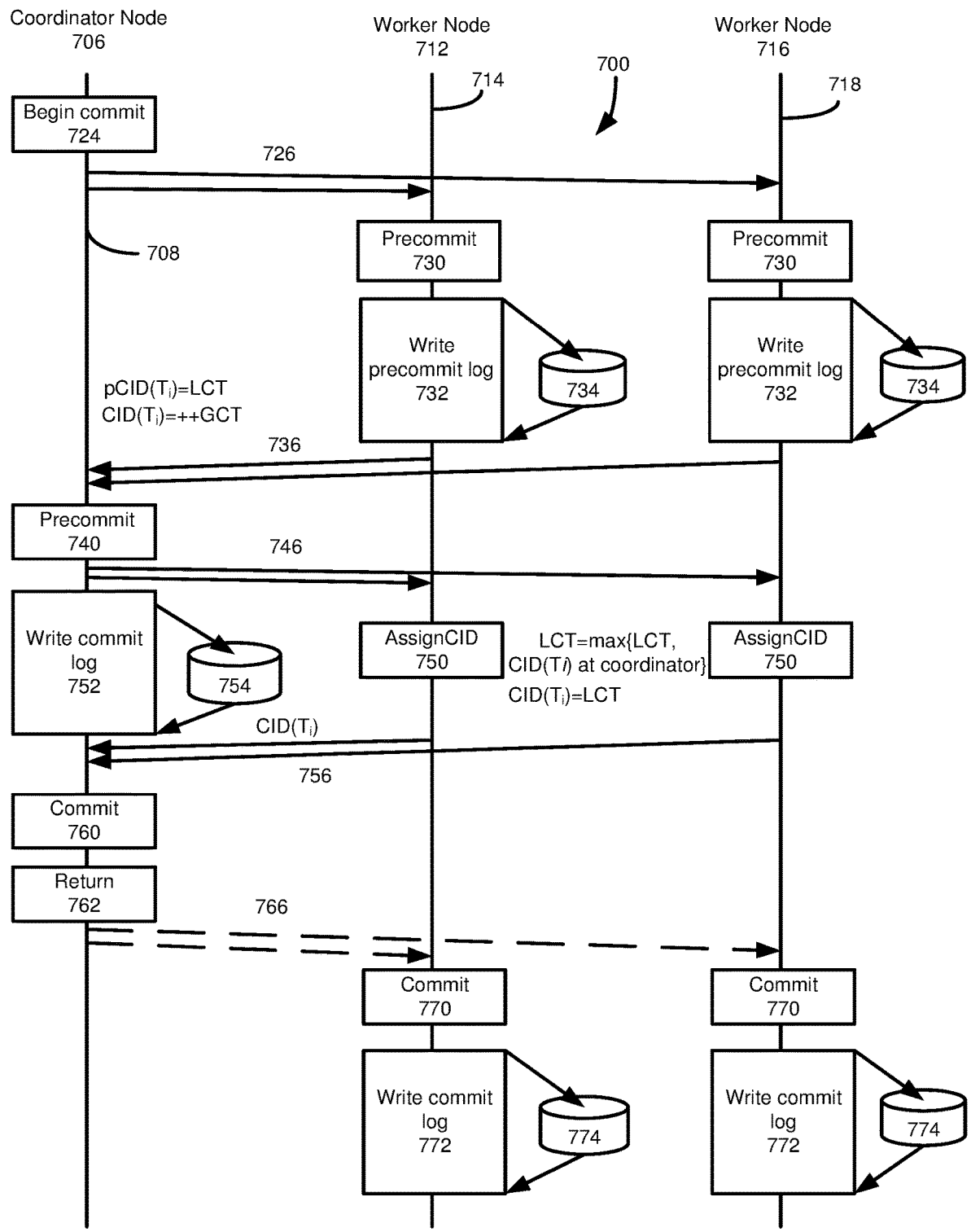
FIG. 7 is a diagram illustrating how a transaction that includes a DDL statement and at least one additional DDL or DML statement commits, using at least certain implementations of a disclosed distributed transaction protocol, when it has updated tables at first and second worker nodes.

FIG. 7 presents a system 700 having a coordinator node 706 and worker nodes 712, 716, with respective execution timelines 708, 714, 718. The system 700 illustrates how a transaction having a DDL statement and at least one of one or more additional DDL statements and one or more DML statements commits after having updated the tables located in more than a single worker node 712, 716. To help provide durable atomicity of changes in multiple nodes 706, 712, 716, the system 700 employs a two-phase commit approach. The commit log of the coordinator node 706 is written only after the precommit log entries of the transaction are safely written to persistent storage at all of the worker nodes 712, 716 changed by the transaction.

The commit protocol begins in block 724, where the coordinator node 706 sends communications 726 to the worker nodes 712, 716 to prepare the worker nodes for the transaction commit. For example, the coordinator node 706 may send the communications 726 in response to a request by a database client (not shown) to commit the transaction. The communications 726, in a particular example, include a TransactionID for the transaction to be committed. In precommit blocks 730, each worker node 712, 716 executes SetAsPrepared to precommit the transaction, assigning the transaction the LCT currently maintained at the worker node. The worker nodes 712, 716 then write the transaction to persistent storage 734, such as in a precommit log, in block 732, flushing the pending redo logs of the transaction. The worker nodes 712, 716 then communicate with the coordinator node 702, via notifications 736, indicating that the transaction has been precommitted at the worker nodes and confirming to the coordinator about the commit readiness of the worker nodes.

When the coordinator node 706 receives the notifications 736, in process block 740, the coordinator node precommits the transaction, assigning the transaction a pCID equal to the current GCT maintained by the coordinator node. The coordinator node 706 also increments the CTS (which is also the GCT, in this case, using IncrementCTS), and assigns the incremented CTS to the transaction as the CID (using AssignCID). Once the coordinator node 706 has precommitted the transaction, including assigning the CID, the coordinator node sends communications 746 to the worker nodes 712, 716 indicating the precommitment and associated CID. The worker nodes 712, 716 then execute process blocks 750, in which they increment their locally maintained LCT value (such as using IncrementCTS). In a particular example, the worker nodes 712, 716 select as the new LCT value the larger of the current LCT value maintained at the worker node and the CID for the transaction received from the coordinator node 706 in communication 746. The worker nodes 712, 716 then assign the new LCT value as the CID for the transaction.

Each worker node 712, 716, after completing block 750, sends a communication 756 to the coordinator node 706, indicating that the transaction was successfully assigned a new CID at the worker nodes. While the communications 746, and the increment and assign functions of blocks 750, are being carried out, the coordinator node 706 writes the commit to persistent storage 754 in block 752 (using WriteCommitLog, for example), such as to a commit log.

When the persistency operation 752 has completed, and the coordinator node 706 has received the communications 756 from each of the worker nodes 712, 716, the coordinator node marks the transaction as committed and releases the locks on any records or tables, such as using SetAsCommitted and ReleaseLocks, in process block 760. The completion of the transaction is acknowledged by the coordinator node 706 to the client that initiated the transaction (not shown) in block 762 (such as using the Return operation).

The coordinator node 706 sends communications 766 to the worker nodes 712, 716, such as asynchronously, that the transaction has been committed by the coordinator node. When the worker nodes 712, 716 receive the communication 766, the worker nodes commit the transaction and release their record or table locks in process 770. The transaction commit is then written by the worker nodes 712, 716 to persistent storage 774, such as a commit log, in process block 772.

The process used in system 700 involves several communications between the coordinator node 706 and the worker nodes 712, 716. To reduce potential performance impacts from these communications, such as network round trips, during commit processing, the second round trip (communications 746 and 756) is overlapped by the log persistency I/O and the third trip (which does not need to be a round trip, in at least some examples) is carried out asynchronously after the transaction's commit is acknowledged to the client in process 762. In terms of transaction latency, only the first round trip, used to help provide durable atomicity for multi-node transactions with DDL, and optionally write operations, presents an added latency cost. In terms of transaction processing throughput, the network cost is reduced, in some examples, by grouping and coalescing the network I/O requests made by concurrent transactions.

By acknowledging the commit earlier in the commit process, without waiting for the final commitment of the transaction by the worker nodes 712, 716 in process blocks 770, 772, the next operation of the same session might encounter a tentative lock conflict if the next operation tries to update the same record or metadata entity updated by the previous transaction. In at least some implementations, the tentative conflict should not produce any unexpected behavior for end users, because the lock wait time period will typically be short compared to common lock timeout values. Following the ordering 600 of FIG. 6, in at least some implementations, the second round trip (746, 756), is not skipped or coalesced with the third communication (766), because the IncrementCTS operation should be carried out before the Return operation.

The multi-node transaction commit process described in FIG. 7 also takes advantage of the delayed visibility decision scheme during the in-doubt period for visibility atomicity across changes distributed to multiple nodes. The coordinator node 706 additionally has an in-doubt period so that it can decide the transaction's CID value earlier and the network I/O for CID propagation (communication 746) can be overlapped by the log persistency I/O (752) for WriteCommitLog at the coordinator node 706.

The WriteCommitLog operations 772 at the worker nodes 712, 716 can be initiated after the Return operation 762 at the coordinator node 706. Even if a worker node 712, 716 crashes without having written its local commit log, the transaction can be detected as an in-doubt transaction during its restart and thus it can be committed again by referring to the coordinator node 706. If there is neither a precommit nor a commit log entry at a worker node 712, 716, then the transaction can be rolled back at the worker node without asking the coordinator node 706.

Note that, in FIG. 7, as long as pCID(T) is smaller than CID(T) for a transaction T, the pCID values of a transaction at different nodes do not need to have the same value, while CID values should be identical, because the pCID values are used as a hint for early filtering of false positive cases.

Note that the commit protocol of FIG. 7 can be implemented in alternative manners, if desired. For instance, in some cases, separate commit identifiers, such as timestamps, may be used for DDL statements and DML statements. Rather than using a LCT value of a slave node 712, 716, the slave nodes can be sent a commit identifier for a DDL statement, such as in communication 746. Or, LCT values of the slave nodes 712, 716 can be used, but the slave nodes can maintain different LCT values for DDL statements and write statements.

Example 8—Example Invalidation of Cached Metadata Entities at Slave Nodes

The delayed visibility scheme, and commit protocol, described in Examples 5-7 can be useful when a transaction includes write operations at multiple nodes, or includes a DDL statement for a metadata entity associated with multiple nodes (e.g., a partitioned table or a database view that is built on tables distributed across multiple node). In the case of DDL statements, an alternative procedure can be applied when master metadata versions are maintained in a common repository, such as a master repository maintained by a coordinator or master node.

Worker nodes can maintain a cached copy of metadata information. When the metadata information at the master node is changed (including based on a change received at a slave node and forwarded to the master node for execution), the prior version of the metadata, cached at the slave nodes, can be invalidated. If an operation at the slave node tries to access invalidated metadata, the slave node can determine that the cached metadata is invalid and update its copy of the metadata from the master node.

Figure 8:
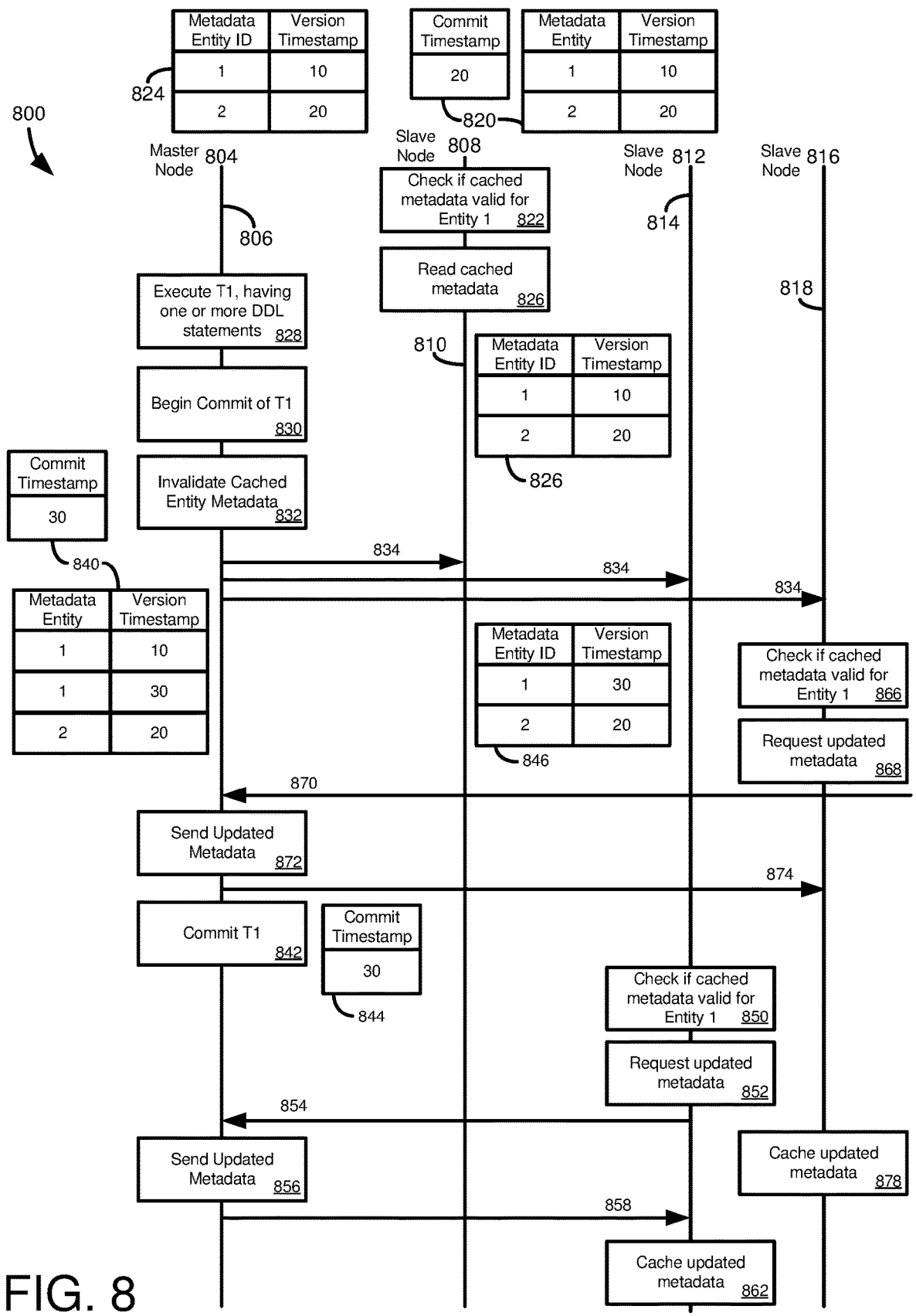
FIG. 8 is a diagram illustrating operations at a master node and multiple slave nodes during the commit of a transaction that includes an operation that modifies or deletes a metadata entity, the operations including invalidating cached versions of the metadata entity at the slave nodes.

FIG. 8 illustrates operations occurring in a scenario 800 for invalidating cached metadata entities at slave nodes, and updating the cached metadata entities of the slave nodes. The scenario 800 includes operations occurring at a master node 804, slave node 808, slave node 812, and slave node 816, having respective execution timelines 806, 810, 814, 818. Each slave node 804, 808, 812 attempts to access an entity in its metadata cache at a different point relative to the commit of a transaction including a DDL operation for the entity at the master node, where the master node maintains a master version of the metadata entity. Although three slave nodes are illustrated, the scenario 800 can involve more or fewer slave nodes, and operations occurring at one slave node can occur at another slave node (e.g., the operations shown as occurring on slave nodes 812, 816 could be carried out at slave node 808, in addition to the operations shown as occurring at slave node 808).

In an initial state, a metadata repository, or catalog, of the master node 804 and the metadata caches of the slave nodes 804, 808, 812 have the content shown in tables 820, 826 where the system has a commit timestamp of 20, a first metadata entity has a version timestamp of 10 and a second metadata entity has a version timestamp of 20. At 822, the slave node 808 checks to see if its cached metadata is valid for metadata entity 1, such as in response to a read request received by the slave node for metadata entity 1. In carrying out the check, the slave node 808 can check to see whether the version information for metadata entity 1 as stored in its cache is consistent with a table 824 listing the current versions for system metadata entities (or, at least system metadata entities stored in the cache of the slave node). In this case, table 824 lists the current version as having a version timestamp of 10, which is the same as the timestamp of the cached version (e.g., in tables 820 of slave node 808). Thus, the slave node 808 determines that its cached version of metadata entity 1 is valid, and processes the read request at 826.

At 828, the master node 804 executes a transaction (or, at least a portion of a transaction) having one or more DDL statements, including a DDL statement that creates a new version of metadata entity 1. The master node 804 begins a commit process for the transaction at 830. At 832, the master node 804 sends notifications 834 to the slave nodes 808, 812, 816, informing the slave nodes that a new version of metadata entity 1 exists. Prior to sending the notifications 834, the master node 804 can update a commit timestamp for the system (e.g., to 30, as shown). The updated timestamp is assigned to the new version of metadata 1, and the updated timestamp and the identifier of the updated metadata entity are sent to the slave nodes 808, 812, 816 in notifications 834, updating table 824 to have the contents of table 846. As shown, notifications 834 do not include the data for the changed entity, but rather provide an indication that the entity has changed. If desired, the system can operate in other manners, including sending the updated entity information in the notifications 834.

At this point, the master node 804 has the information shown in tables 840. The commit timestamp for the system has been updated to 30, and the metadata repository include two versions of metadata entity 1, each associated with a particular timestamp value. As described above, prior versions of metadata entities can be periodically garbage-collected. The master node 804 commits the transaction T1 at 842, including updating a global commit timestamp, as shown in table 840.

After receiving the notifications 834, the version tables 824 of the slave nodes 804, 808, 812 are updated to have the contents shown in table 846. In table 846, the identifier for metadata entity 1 is now associated with the latest version at the master node 804, having a version timestamp of 30. Note that, at this point, in at least some implementations, the metadata caches of the slave nodes 808, 812, 816 have not been modified to include the new metadata entity version itself.

The execution timeline 814 for slave node 812 includes operation 850, which checks to see if the cached metadata for metadata entity 1 is valid. In this case, table 840 indicates that the current version of metadata entity 1 has a version timestamp of 30, while the version of metadata 1 cached at the slave node 808 has a version timestamp of 10. Thus, the slave node 812 determines that its metadata cache is invalid for metadata entity 1. At 852, slave node 812 sends a request 854 to the master node 804 for a current version of metadata entity 1. The master node 804 sends the updated version of metadata entity 1 to the slave node 812 at 856 in communication 858. The slave node 812 stores the updated metadata for metadata entity 1 at 862.

Note that the possibility of a slave node reading an outdated version of entity metadata (e.g., where a new version is being committed at the master node 804, but commit has not fully completed) can be reduced, or eliminated, by invalidating cached metadata at the slave nodes 808, 812, 816 during the commit process, in notifications 834. Timeline 818 for slave node 816 illustrates this scenario. At 866, slave node 816 checks to see if its cached version of metadata entity 1 is valid, such as in response to a read request received by the slave node. Even though the check at 866 is carried out before final commit of T1 at the master node 804 at 842, the table 846 of slave node 816 has already been updated to reflect the new version of metadata entity 1 at the master node. Accordingly, the slave node 816 can request updated metadata entity from the master node at 868 in communication 870. The master node 804 sends updated metadata to the slave node 816 at 872 in communication 874. At 878, the slave node 816 caches the new version of metadata entity 1.

Example 9—Rollback of Multi-Operation Transaction Including a DDL Statement

As previously described, an advantage of the disclosed innovations is the ability to abort, or rollback, multiple DDL statements, or a transaction that includes one or more DDL statements and one or more DML statements, without an application having to implement potentially complex rollback algorithms In particular aspects, rollback can be carried out by registering callback functions for operations that would need to be rolled back if the transaction were aborted. The operations can be to reverse the results of original operations in the transaction, or otherwise restore a state of the database system prior to execution of transaction operations. For instance, if the transaction resulted in the creation of a new metadata entity version, the new version should be deleted, and a prior version, if any, restored. If a metadata entity was deleted as part of a transaction, the metadata entity should be restored.

Figure 9:
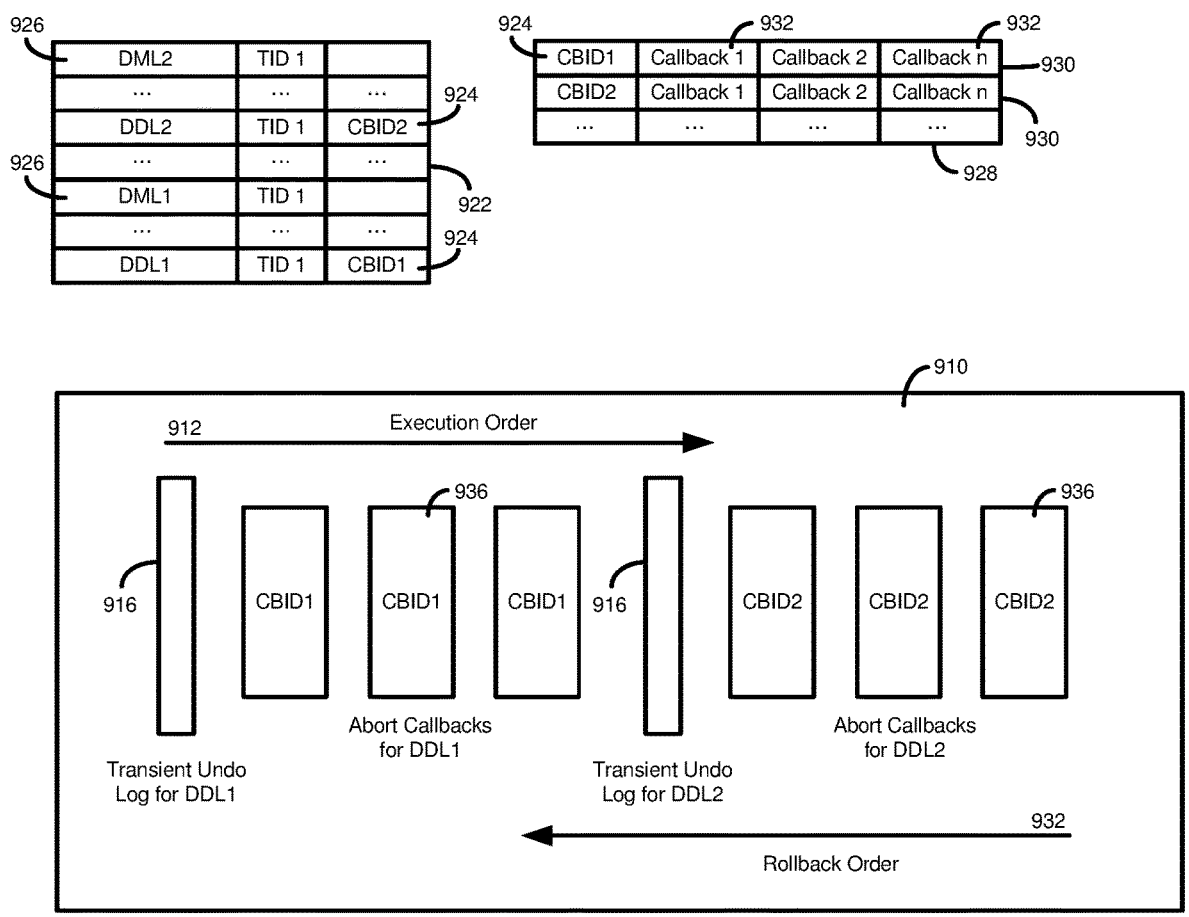
FIG. 9 schematically depicts execution and rollback orders for a transaction that includes multiple DDL statements, including the registering and calling of callbacks, as well as an example undo log and an example callback table.

Diagram 910 of FIG. 9 schematically depicts one way rollbacks can be implemented. Diagram 910 is shown with an execution order 912, progressing from left to right. As operations are executed (e.g., DDL or DML statements and their component operations), log entries for each statement 918 (e.g., DDL1 and DDL2, as shown) are added to an undo log 916, further detailed in table 922. The undo log table 922 can include the identity of the operation or statement 918 (e.g. DDL1, DML2), an identifier for the transaction with which the operation or statement is associated, and a reference 924 (such as a pointer) to any callbacks 930 that are associated with the statement or operation.

The callbacks 930 can be maintained as shown in table 928, which includes the callback identifier 924 from undo log 922 and then the actual callback functions 932 to be executed. When a statement or operation in a transaction is associated with a callback 930, the statement or operation can be associated with one or more callback functions 932. In some cases, a statement or operation need not be associated with a callback 930.

Although the undo log 922 includes statements and operations from multiple transactions, the correct statements and operations for a particular transaction can be identified using the transaction identifier stored in the entries of the undo log 922. The use of the table 928 allows multiple callback functions 932 to be executed using a single reference 924 in the undo log 922.

Entries can be added to the undo log 922 chronologically, which can allow the entries to be undone in the correct order by parsing the log in reverse chronological order (e.g., top-down). As shown, the diagram 910 has a rollback order 932, from right-to-left, that is the reverse of the execution order 912. The diagram 910 also illustrates callback functions 932 for each of the statements 918, which, during rollback, can be executed in the reverse order in which they were registered during execution according to the execution order 912. The callbacks functions 932 can be stored and retrieved in an appropriate sequence in the table 928 to allow the callback functions to be executed in the reverse order (e.g., the rollback order 932) of the execution order 912.

Figure 10:
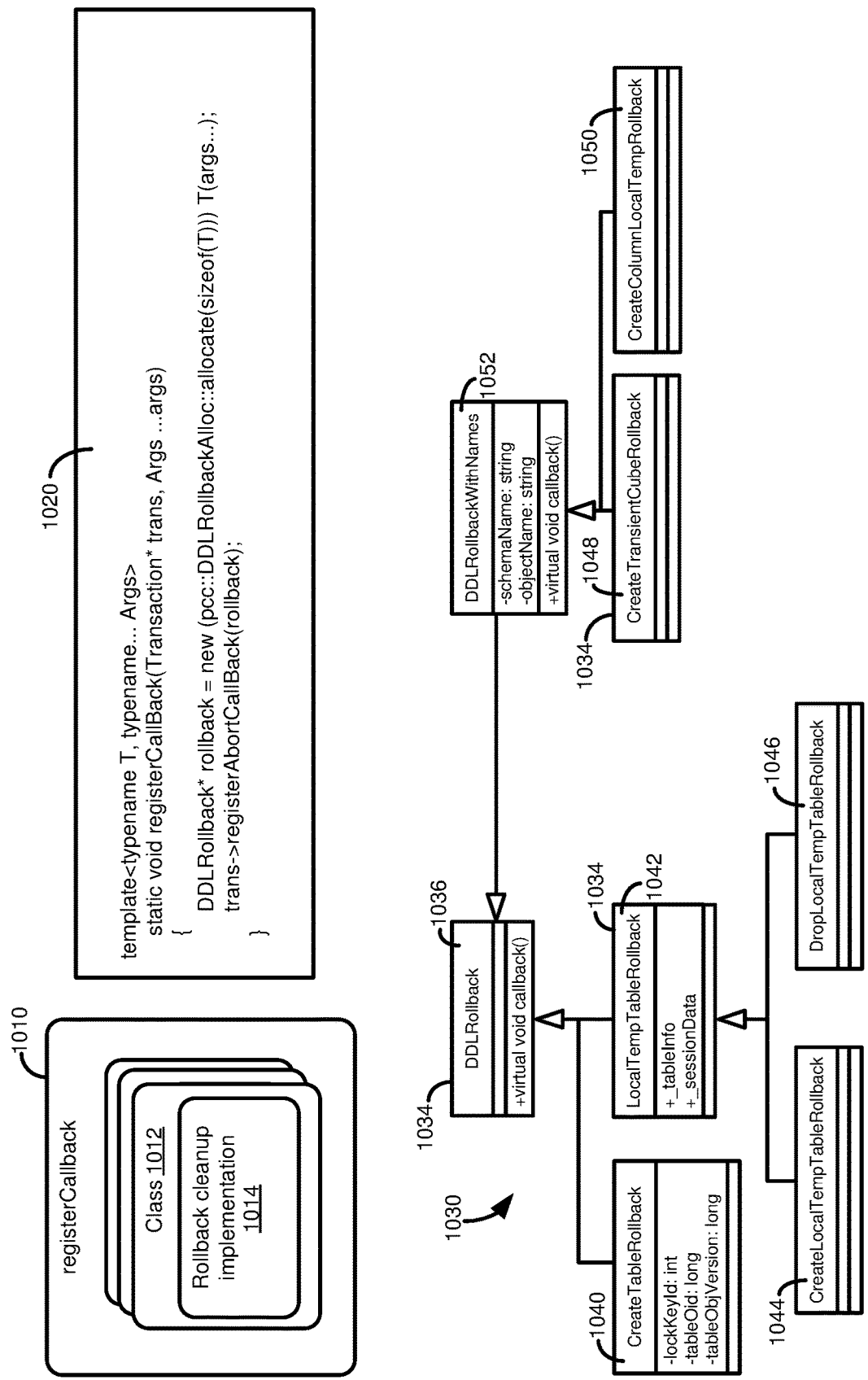
FIG. 10 schematically depicts a variadic callback function according to a disclosed innovation, as well as an example implementation of a callback registration function and an example class diagram for undoing operations in an aborted transaction.

FIG. 10 illustrates a particular way in which callbacks may be implemented. Specifically, the callbacks can be implemented using a variadic template (e.g. diagram 1010), which an argument supplied when the template is instantiated specifies a particular class 1012 associated with a particular type of metadata entity operation, and implementing clean-up functions 1014 to undo the operation (e.g., restoring a prior metadata entity version, deleting newly creating versions, etc.).

FIG. 10 also provides an example implementation 1020 of a function for registering callbacks. The template can be instantiated using the appropriate class for the metadata operation associated with the callback function, and the arguments needed to execute the callback function. The implementation 10102 of the registerCallback function accepts an identifier for a transaction (e.g., a pointer) as an actual parameter, creates a pointer 'rollback' of type DDL-Rollback that points to the address of a newly instantiated class member (of the specified class type, T, for the template), and calls a registerAbortCallBack function of the transaction with the DDLRollback pointer as the argument. The type T thus specifies the appropriate cleanup implementations 1014 that should be called.

FIG. 10 illustrates an example class diagram 1030 for various types of classes 1034 associated with metadata entity operations (and which are associated with clean up functions 1014 in a callback). The classes 1034 include a base class 1036 of DDLRollback and derived classes of CreateTableRollback 1040, to rollback the creation of a table (e.g., to delete the table), LocalTempTableRollback 1042 to rollback the creation (CreateLocalTempRollback 1044) or deletion (DropLocalTempTableRollback 1046) of a local temporary table, CreateTransientCubeRollback 1048, to rollback the creation of a transient OLAP cube, and CreateColumnLocalTempRollback 1050, to rollback the creation of a column in a local temporary table, both derived classes of DDLRollbackWithNames 1052. The classes 1034 illustrated, and their relation, are for example only, and in practice, more, fewer, or different classes can be used, and the classes can have a different relationship than shown.

Example 10—Deadlock Detection and Handling

Figure 11:
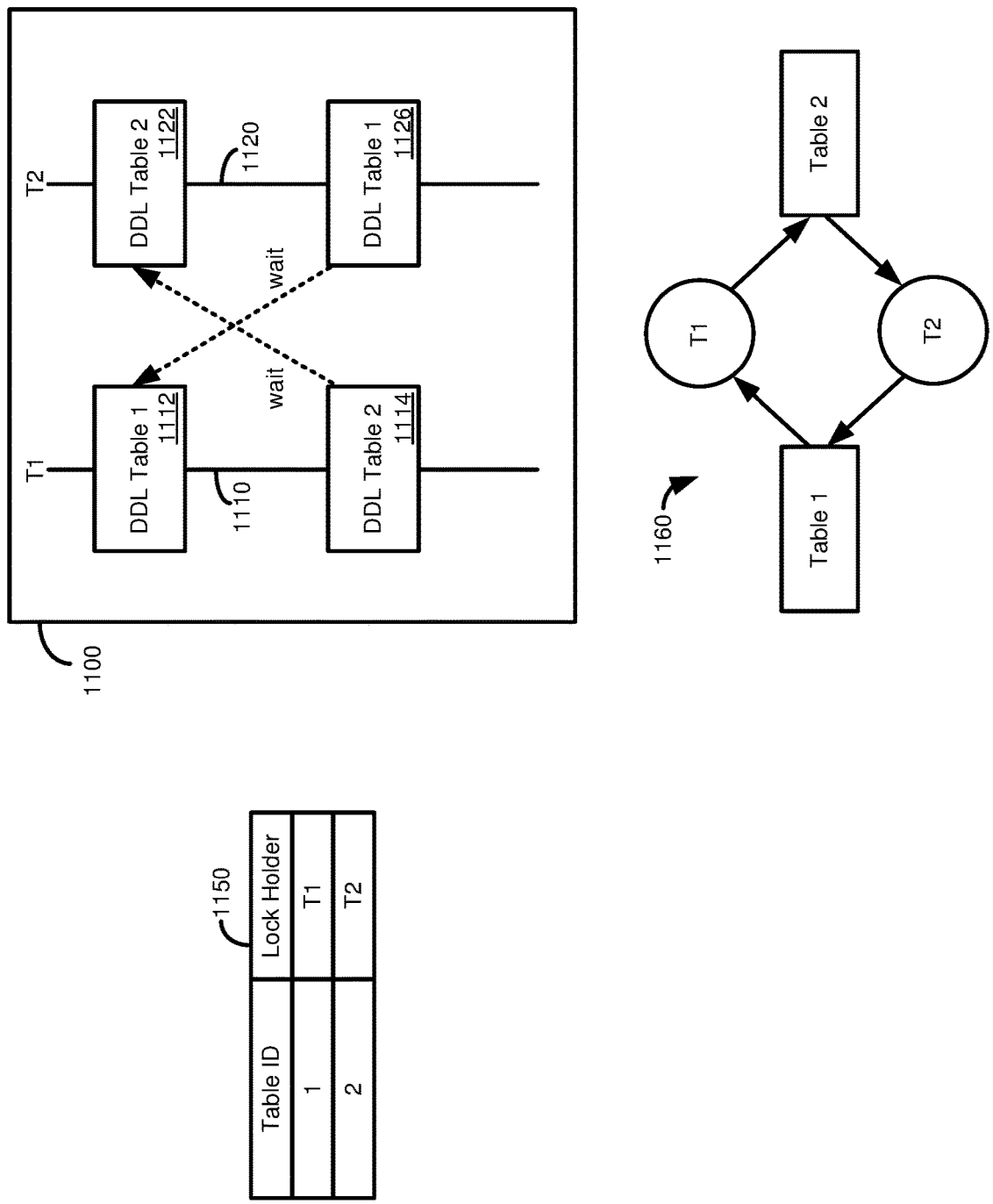
FIG. 11 presents a schematic depiction of how a deadlock situation can arise when a transaction includes multiple DDL statements, an example lock table, and an example resource management graph.

Although providing for the atomic commit of transactions that include a DDL statement and at least one of one or more additional DDL statements and one or more DML statements can provide various advantages, it can potentially result in deadlock situations, including because DDL statements typically acquire exclusive table locks of their affected table. Diagram 1100 of FIG. 11 illustrates how concurrent DDL statements can give rise to a deadlock.

In a first transaction 1110, T1, a DDL statement is executed on Table 1 at 1112. As part of the executing, T1 acquires an exclusive lock of Table 1. Before T1 is to commit, it also is to execute a DDL statement on Table 2 at 1114. However, a second transaction 1120 executed a DDL statement on Table 2 at 1122, thereby acquiring an exclusive lock of Table 2. Because of the exclusive lock of Table 2 held by the second transaction 1120, the first transaction 1110 enters a waiting state prior to executing its DDL statement on Table 2 at 1114. However, before the second transaction 1120 is to commit, it is to carry out a DDL statement on Table 1 at 1126. Because the first transaction 1110 acquired an exclusive lock of Table 1 as a result of operation 1112, the second transaction 1120 enters a waiting state prior to operation 1126. Because the first transaction 1110 and the second transaction 1120 are each waiting for the other, neither can finish, and so a deadlock state is produced.

To detect whether a deadlock situation exists, the database system can maintain a table 1150 that records lock information for any tables subject to a lock. The table 1150 can maintain an identifier for the affected table (including a hash value generated using the table identifier) and an identifier of the lock holder (e.g., a particular transaction that has acquired the lock). The table 1150 can be used to generate a resource allocation graph 1160 that can be traversed to determine whether a deadlock exists. In particular, if the resource allocation graph 1160 includes a cycle, a deadlock can be identified.

If a deadlock is identified, it can be handled in a variety of ways. In one implementation, the transaction where a deadlock is first detected is aborted, and an error is thrown, and the other transaction involved in the deadlock is allowed to proceed. In other cases, an error can be thrown when a deadlock is detected, the identities of the transactions involved in the deadlock are provided to a database client, and the database client can determine which transaction to abort and which to allow to complete. In still further implementations, one of the transactions associated with the deadlock is aborted, the other transaction is allowed to complete, and then the aborted transaction is automatically restarted.

Figure 12:
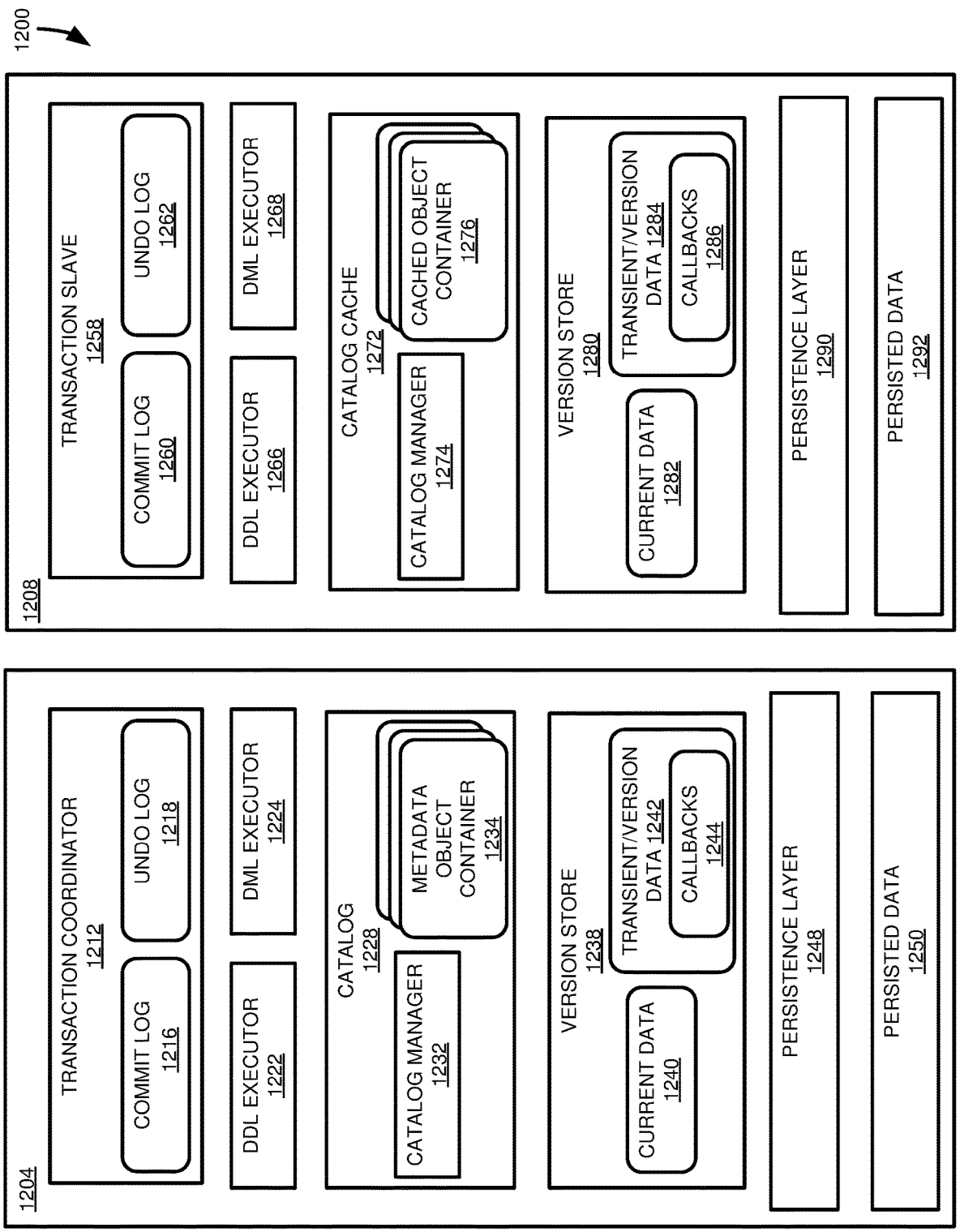
FIG. 12 schematically depicts an example database environment, having a master node and a slave node, in which at least certain of the present innovations can be implemented.

Example 11—Example Database System Architecture Having Coordinator Node Metadata Master FIG. 12 illustrates an example architecture 1200 of a database system having a master node 1204 and a slave node 1208. Although a single slave node 1208 is shown, it should be appreciated that the architecture 1200 can include multiple slave nodes. In addition, a particular database node may serve as both a slave node and as a master node, such as for different transactions, or other functions.

The master node 1204 can operate a transaction coordinator 1212. The transaction coordinator 1212 can manage the commit of transactions (e.g., containing DML and/or DDL statements) in a distributed database environment. As part of its management, the transaction coordinator 1212 can maintain a commit log 1216 that records committed transactions, and typically includes a commit identifier, or timestamp, assigned to the transaction. Assigning the commit identifier to a transaction can also be a function of the transaction coordinator 1212. The transaction coordinator 1212 can maintain an undo log 1218, which can record operations (e.g. DML or DDL statements), such as in their order of execution. If a transaction is to be aborted, or rolled back, the transaction coordinator 1212 can do so using the undo log 1218. The undo log 1218, in some implementations, can be the undo log 916 of FIG. 9, can be structured as shown for the table 922, and can be linked to callbacks, such as having the structure of the table 928. In other cases, the undo log 1218 can be implemented in a different manner.

The maser node 1204 can also include a DDL executor 1222 and a DML executor 1224, which can execute, respectively, DDL statements and DML statements at the master node. The master node 1204 can maintain a catalog 1228, or repository, of metadata associated with the database system 1200. The catalog 1228 can include a catalog manager 1232, which can be responsible for retrieving items from, and updating items in, the catalog 1228, including in conjunction with the DDL executor 1222. The catalog 1228 can store a plurality of metadata entities, which can be maintained in metadata object containers 1234. The metadata object containers 1234 can be, for example, abstract data types that include data associated with the metadata entity, as well as implementing methods for accessing, updating, or otherwise using the metadata entities.

The master node 1204 can maintain a version store 1238. The version store 1238 can maintain versions of metadata entities of the database system 1200, as well as versions of data records, such as depicted in FIG. 3. In particular, the version store 1238 can maintain current data versions 1240 and transient or prior version data 1242. The transient version data 1242 can be associated with callbacks 1244, such as the callbacks described in FIGS. 9 and 10. The callbacks 1244 can allow the transient data versions 1242 to be deleted or reinstantiated if a transaction is aborted. Accordingly, the version store 1238 can maintain version data for different versions of committed metadata entity versions or committed data record versions, but can also maintain version data for uncommitted data versions. In other cases, transient data versions and committed data versions can be maintained in a different manner.

The master node 1204 can include a persistence layer 1248, which can manage the transfer of data to and from persisted data 1250 stored on a persistent storage medium (e.g., tape or hard disk). The persistence layer 1248 can periodically persist (e.g., save) various data (e.g., database records) and metadata associated with the master node 1204, including the contents of the commit log 1216, the undo log 1218, the metadata object containers 1234, as well as other operational parameters of the master node 1204 or the database system 1200. The persistence layer 1248 can also persist at least some data of the version store 1238, such as committed versions of database records and metadata entities. In some cases, all persisted data 1250 can be stored on the same medium, while in other cases persisted data can be stored on different media, including storing different types of persisted data on different media. Similarly, the persistence layer 1248 can persist all data and metadata in the same manner (e.g., at the same frequency), or can use different schemas to persist different types of data or metadata. Persistence operations can be carried out at different frequencies for different types of data or metadata.

The master node 1204 is in communication with the slave node 1208. The slave node 1208 can operation a transaction slave 1258. The transaction slave 1258 can maintain a commit log 1260 and an undo log 1262, which can be implemented at least generally as described for the commit log 1216 and the undo log 1218. However, it at least some cases, the commit log 1260 and the undo log 1262 maintain information for transactions carried out at least in part on the slave node 1208, while the commit log 1216 and the undo log 1218 of the master node 1204 can maintain commit and/or undo information for all transactions carried out on the database system 1200.

The slave node 1208 can include a DDL executor 1266 and a DML executor 1268, which can be implemented at least generally as described for the DDL executor 1222 and the DML executor 1224 of the master node 1204. The slave node 1208 can also include a catalog cache 1272, which can store all or a portion of the data maintained in the catalog 1228 of the mater node 1204. In at least some cases, the catalog cache 1272 of the slave node 1208 maintains a subset of information of the catalog 1228, such as information for metadata entities associated with tables maintained by the slave node 1208, but not for tables not maintained by the slave node. Other information, such as the location/distribution of tables or database records across the database system 1200 can be maintained in the catalog cache 1272 for the entire database system, such as for use in query routing or transaction execution.

The catalog cache 1272 can be managed by a catalog manager 1274. The catalog manager 1274 can be implemented, in some respects, in a similar manner as the catalog manager 1232, storing and retrieving information from a cached object container 1276 rather than the metadata object container 1234. The catalog manager 1274 of the slave node 1208 can communicate with the catalog manager 1232 of the master node 1204, such as to receive information regarding version information for metadata entities and receive copies of metadata entities. For instance, the catalog manager 1232, 1274 can carry out at least a portion of the operations of FIG. 8.

The cached object container 1276 can store metadata entities, including in association with version information. As described with respect to FIG. 8, or as implemented in another manner, cached versions of metadata entities maintained in the cached object container 1276 can be invalidated when an updated version of the metadata entity is created in the database system 1200, such as by the master node 1204. In some cases, when a cached metadata entity is determined to be out of date, a new version of the metadata entity can be requested, such as by the catalog manager 1274, from the master node 1204.

The slave node 1208 can include a version store 1280, which can be implemented in an analogous manner to the version store 1238 of the master node 1204, including maintaining current data 1282, transient data versions 1284, and callbacks 1286. However, in some cases, the version store 1280 can omit the transient data versions 1284 or the callbacks 1286. For example, such operations may be executed by the master node 1204, with the master node sending committing data versions (e.g., committed versions of metadata entities) to the slave node 1208 to be stored in the version store 1280.

The slave node 1208 can maintain a persistence layer 1290 and persisted data 1292, which can be implemented in a manner analogous to the persistence layer 1248 and the persisted data 1250 of the master node 1204.

The database system 1200 can include more or fewer components than shown, and may be organized in other manners. For example, functionality of a particular component can be carried out by another component. In addition, in at least some cases, functionality can be carried out using multiple components. In some cases, the DDL executor 1222 and the DML executor 1224 can be components of the transaction coordinator 1212. The version store 1238 can be structured differently that shown, including as separate stores for committed versions and transient, uncommitted versions.

Example 12—Example Operations

Figure 13:
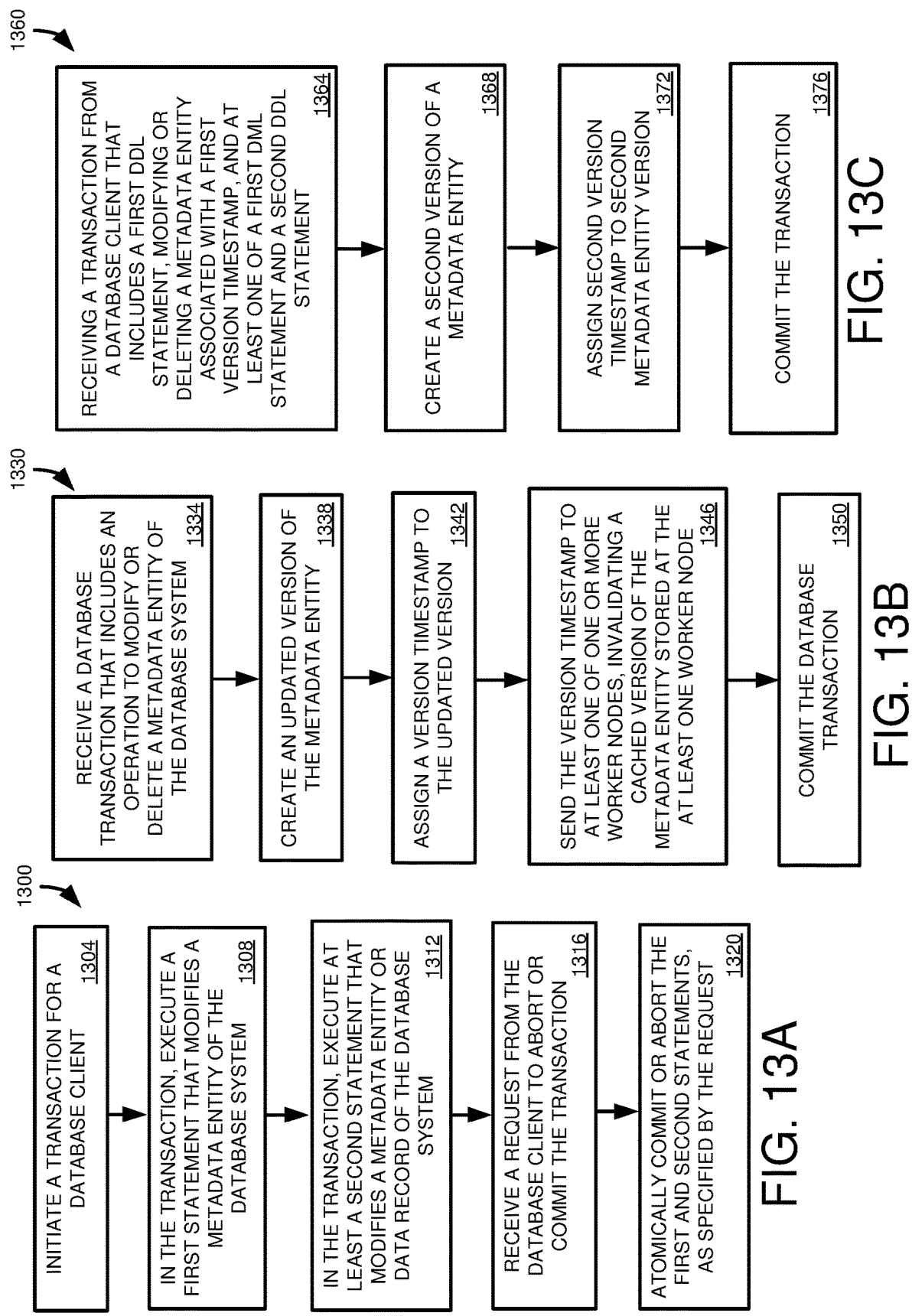
FIG. 13A is a flowchart of operations occurring at a master node during the atomic commit of a transaction that includes a first statement that modifies a metadata entity of the database system and a second statement that modifies a metadata entity or data record of the database system.
FIG. 13B is a flowchart of operations occurring at a coordinator node during the commit of a transaction that modifies or deletes a metadata entity of the database system, where the master node sends a new version timestamp to at least one of one or more worker nodes, invalidating a cached version of the metadata entity stored at the at least one worker node.
FIG. 13C is a flowchart of operations occurring at a master node during the commit of a transaction that includes a DDL statement and at least another DDL statement or a DML statement, where a new version of a metadata entity, having a new version timestamp, is created.

FIG. 13A presents a flowchart of example operations 1300 at a master node during the commit processing of a transaction that includes an operation the modifies a metadata entity of the database system and another operation, which modifies a metadata entity or data record of the database system. The operations 1300 can be carried out, for example, using the database system 1200 of FIG. 12.

At 1304, a transaction is initiated for a database client. In the transaction, at 1308, a first statement is executed that modifies a metadata entity of the database system. At 1312, in the transaction, at least a second statement is executed. The second statement modifies a metadata entity or data record of the database system, such as a DDL statement or a DML statement. Note that the DML statement, when the second statement is a DML statement, can precede the first statement (e.g., a DDL statement). That is, "first" and "second" do not imply any temporal ordering.

A request is received at 1316 from the database client to abort or commit the transaction. The transaction is atomically committed or aborted at 1320, as specified by the request. For instance, when the transaction is atomically committed, the first and second statements become visible to other database clients at the same time.

FIG. 13B presents a flowchart of operations 1330 occurring at a master node during commit processing of a transaction that includes an operation to modify or delete a metadata entity of the database system, where the modified or deleted metadata entity is represented by a new version of the database entity, having a version timestamp. The operations 1300 can be carried out, for example, using the database system 1200 of FIG. 12.

At 1334, a database transaction is received by the master node that includes an operation to modify or delete a metadata entity of the database system. An updated version of the metadata entity is created at 1338. At 1342, a version timestamp is assigned to the updated version. The version timestamp is sent, at 1346, to at least one of one or more worker nodes. The version timestamp invalidates a cached version of the metadata entity stored at the at least one worker node. The database transaction is committed at 1350.

FIG. 13C presents a flowchart of operations 1360 occurring at a master node during commit processing of a transaction that modifies or deletes a metadata entity, where the modified or deleted entity is represented by a new version of the metadata entity. The operations 1300 can be carried out, for example, using the database system 1200 of FIG. 12.

At 1364, a transaction is received from a database client that includes a first DDL statement that modifies or deletes a metadata entity associated with a first version timestamp. The transaction also includes at least one of a first DML statement and a second DDL statement. A second version of the metadata entity is created at 1368. The second version is assigned a second version timestamp at 1272. The transaction is committed at 1376.

Example 13—Computing Systems

Figure 14:
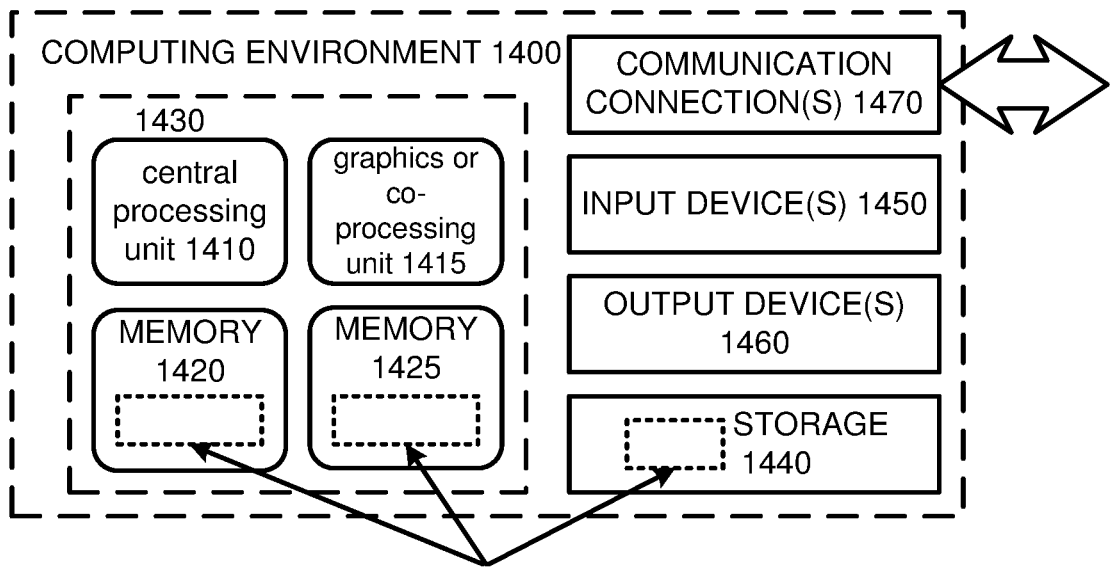
FIG. 14 is a diagram of an example computing system in which some described embodiments can be implemented.

FIG. 14 depicts a generalized example of a suitable computing system 1400 in which the described innovations may be implemented. The computing system 1400 is not intended to suggest any limitation as to scope of use or functionality of the present disclosure, as the innovations may be implemented in diverse general-purpose or special-purpose computing systems.

With reference to FIG. 14, the computing system 1400 includes one or more processing units 1410, 1415 and memory 1420, 1425. In FIG. 14, this basic configuration 1430 is included within a dashed line. The processing units 1410, 1415 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 14 shows a central processing unit 1410 as well as a graphics processing unit or co-processing unit 1415. The tangible memory 1420, 1425 may be volatile memory (e.g., registers, cache, RAM), non-volatile memory (e.g., ROM, EEPROM, flash memory, etc.), or some combination of the two, accessible by the processing unit(s) 1410, 1415. The memory 1420, 1425 stores software 1480 implementing one or more innovations described herein, in the form of computer-executable instructions suitable for execution by the processing unit(s) 1410, 1415.

A computing system 1400 may have additional features. For example, the computing system 1400 includes storage 1440, one or more input devices 1450, one or more output devices 1460, and one or more communication connections 1470. An interconnection mechanism (not shown) such as a bus, controller, or network interconnects the components of the computing system 1400. Typically, operating system software (not shown) provides an operating environment for other software executing in the computing system 1400, and coordinates activities of the components of the computing system 1400.

The tangible storage 1440 may be removable or non-removable, and includes magnetic disks, magnetic tapes or cassettes, CD-ROMs, DVDs, or any other medium which can be used to store information in a non-transitory way and which can be accessed within the computing system 1400. The storage 1440 stores instructions for the software 1480 implementing one or more innovations described herein.

The input device(s) 1450 may be a touch input device such as a keyboard, mouse, pen, or trackball, a voice input device, a scanning device, or another device that provides input to the computing system 1400. The output device(s) 1460 may be a display, printer, speaker, CD-writer, or another device that provides output from the computing system 1400.

The communication connection(s) 1470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 14—Cloud Computing Environment

Figure 15:
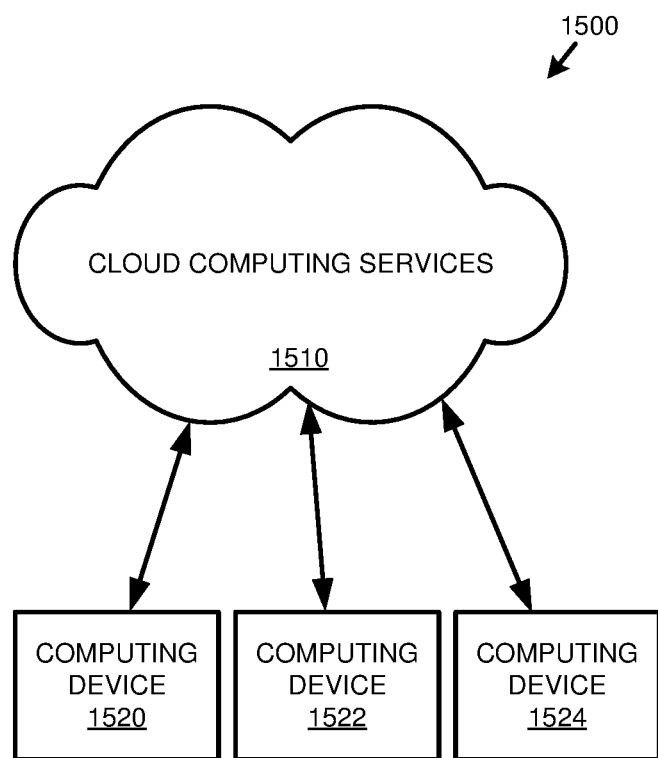
FIG. 15 is an example cloud computing environment that can be used in conjunction with the technologies described herein.

FIG. 15 depicts an example cloud computing environment 1500 in which the described technologies can be implemented. The cloud computing environment 1500 comprises cloud computing services 1510. The cloud computing services 1510 can comprise various types of cloud computing resources, such as computer servers, data storage repositories, networking resources, etc. The cloud computing services 1510 can be centrally located (e.g., provided by a data center of a business or organization) or distributed (e.g., provided by various computing resources located at different locations, such as different data centers and/or located in different cities or countries).

The cloud computing services 1510 are utilized by various types of computing devices (e.g., client computing devices), such as computing devices 1520, 1522, and 1524. For example, the computing devices (e.g., 1520, 1522, and 1524) can be computers (e.g., desktop or laptop computers), mobile devices (e.g., tablet computers or smart phones), or other types of computing devices. For example, the computing devices (e.g., 1520, 1522, and 1524) can utilize the cloud computing services 1510 to perform computing operators (e.g., data processing, data storage, and the like).

Example 15—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 14, computer-readable storage media include memory 1420 and 1425, and storage 1440. The term computer-readable storage media does not include signals and carrier waves. In addition, the term computer-readable storage media does not include communication connections (e.g., 1470).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented in a database environment, including by at least one computing device of the database environment comprising one or more hardware processors and at least one memory, the method comprising:

receiving a first request from a database client to initiate a database transaction;

initiating the database transaction for the database client in response to the first request;

in the database transaction, executing a first data definition language (DDL) statement that modifies a metadata entity of the database system;

in the database transaction, executing at least a second statement, the at least a second statement being a second DDL statement or a data manipulation language (DML) statement;

receiving a second request from the database client to abort or commit the database transaction; and atomically committing or aborting the first DDL statement and the second statement as a unit, as specified by the second request.

2. The method of claim 1, wherein the second statement is a second DDL statement.

3. The method of claim 1, wherein the second statement is a DML statement.

4. The method of claim 1, further comprising maintaining lock information for any statements in the database transaction that modify metadata information for the database system, the lock information comprising an identifier for one or more tables locked in the database transaction and an identifier for the database transaction.

5. The method of claim 4, further comprising analyzing the lock information to determine whether a deadlock exists.

6. The method of claim 1, wherein the database transaction is atomically committed, the atomic commit comprising assigning a commit identifier to the first DDL statement and the at least a second statement, wherein the first DDL statement or the at least a second statement are not visible to other database clients until the commit identifier has been assigned.

7. The method of claim 1, wherein the first DDL statement modifies a first version of a database metadata entity and executing the first DDL statement comprises creating a second version of the metadata entity.

8. The method of claim 1, further comprising:
writing operations associated with the first DDL statement and the at least a second statement to an undo log; and
if the second request is to abort the database transaction, reading the undo log and undoing changes to the database system made by the first DDL statement and the at least a second statement.

9. The method of claim 1, wherein executing the first DDL statement comprises registering a callback, the callback being associated with one or more methods to undo changes to the database system made by the first DDL statement.

10. The method of claim 9, wherein the second request is to abort the database transaction and the method further comprises executing the callback.

11. The method of claim 1, wherein the first DDL statement and the at least a second statement are executed at different database nodes.

12. The method of claim 1, the method further comprising:
receiving a third request to read database data, the database data comprising data associated with a table associated with the first DDL statement;
assigning a snapshot timestamp value to the third request;
comparing the snapshot timestamp value to version timestamps of a plurality of versions of a metadata entity modified by the first DDL statement; and
selecting a version of the metadata entity having the largest version timestamp that is less than or equal to the snapshot timestamp value.

13. The method of claim 1, wherein the second request is a request to commit the database transaction and the method further comprises:
determining one or more nodes maintaining a cached copy of a metadata entity modified by the first DDL statement;
assigning a version identifier to the modified metadata entity; and
sending the version identifier to one or more worker nodes.

14. The method of claim 1, wherein the second request is a request to commit the database transaction and the method further comprises:
sending a third request to a slave node to mark a metadata entity modified by the first DDL statement as precommitted;
receiving a fourth request to read the metadata entity;
delaying the fourth request to read the metadata entity until the metadata entity is marked as committed or aborted; and
determining a version of the metadata entity to be provided in response to the fourth request to read the metadata entity.

15. A server comprising:
one or more memories;
one or more processing units coupled to the one or more memories; and
one or more computer readable storage media soring computer-executable instructions specifying operations for:
receiving from a database client a database transaction that includes a data definition language (DDL) statement to modify or delete a metadata entity of the database system;
executing the query language operation to create an updated version of the metadata entity;
assigning a version timestamp to the updated version;
sending the version timestamp to at least one of the one or more worker nodes, wherein the version timestamp invalidates a cached version of the metadata entity stored at the at least one worker node; and
committing the database transaction.

16. The server of claim 15, wherein the sending occurs before the committing.

17. The server of claim 15, wherein the metadata entity is a definition of a table or a view.

18. The server of claim 15, wherein the transaction further comprises at least another DDL statement or comprises a data manipulation language (DML) statement, and the DDL statement and the at least another DDL statement or the DML statement are committed atomically as a unit.

19. The server of claim 15, wherein the transaction comprises at least one operation executable at the coordinator node and at least one operation executable on at least one of the worker nodes.

20. One or more computer-readable storage media comprising:
computer-executable instructions that, when executed, cause a computing device to receive a transaction from a database client comprising a first DDL statement and at least one of at least a first DML statement and at least a second DDL statement, wherein the first DDL statement modifies or deletes a metadata entity of the database system, the metadata entity being a first version associated with a first version timestamp;
computer-executable instructions that, when executed, cause a computing device to create a second version of the metadata entity in response to the first DDL statement;
computer-executable instructions that, when executed, cause a computing device to assign a second version timestamp to the second version of the metadata entity; and
computer-executable instructions that, when executed, cause a computing device to commit the transaction, the committing comprising committing the first DDL statement and the first DML statement or the at least a second DDL statement as a unit;
wherein the first and second versions are concurrently maintained on the server for a time period.

21. A computing system comprising:
one or more memories;

one or more processing units coupled to the one or more memories; and one or more computer readable storage media storing computer-executable instructions specifying operations for:

receiving a first request from a database client to initiate a database transaction;

initiating the database transaction for the database client in response to the first request;

in the database transaction, executing a first data definition language (DDL) statement that modifies a metadata entity of the database system;

in the database transaction, executing at least a second statement, the at least a second statement being a second DDL statement or a data manipulation language (DML) statement;

receiving a second request from the database client to abort or commit the database transaction; and atomically committing or aborting the first DDL statement and the second statement as a unit, as specified by the second request.

22. The computing system of claim 21, wherein the second statement is a second DDL statement.

23. The computing system d of claim 21, wherein the second statement is a DML statement.

24. The computing system of claim 21, the operations further comprising:

maintaining lock information for any statements in the database transaction that modify metadata information for the database system, the lock information comprising an identifier for one or more tables locked in the database transaction and an identifier for the database transaction.

25. The computing system of claim 24, the operations further comprising: analyzing the lock information to determine whether a deadlock exists.

26. The computing system of claim 21, wherein the database transaction is atomically committed, the atomic commit comprising assigning a commit identifier to the first DDL statement and the at least a second statement, wherein the first DDL statement or the at least a second statement are not visible to other database clients until the commit identifier has been assigned.

27. The computing system of claim 21, wherein the first DDL statement modifies a first version of a database metadata entity and executing the first DDL statement comprises creating a second version of the metadata entity.

28. The computing system of claim 21, the operations further comprising:

writing operations associated with the first DDL statement and the at least a second statement to an undo log; and if the second request is to abort the database transaction, reading the undo log and undoing changes to the database system made by the first DDL statement and the at least a second statement.

29. The computing system of claim 21, wherein executing the first DDL statement comprises registering a callback, the callback being associated with one or more methods to undo changes to the database system made by the first DDL statement.

30. The computing system of claim 29, wherein the second request is to abort the database transaction and the method further comprises executing the callback.

31. The method of claim 21, wherein the first DDL statement and the at least a second statement are executed at different database nodes.

32. The computing system of claim 21, the operations further comprising:

receiving a third request to read database data, the database data comprising data associated with a table associated with the first DDL statement;

assigning a snapshot timestamp value to the third request;

comparing the snapshot timestamp value to version timestamps of a plurality of versions of a metadata entity modified by the first DDL statement; and selecting a version of the metadata entity having the largest version timestamp that is less than or equal to the snapshot timestamp value.

33. The computing system of claim 21, wherein the second request is a request to commit the database transaction, the operations further comprising:

determining one or more nodes maintaining a cached copy of a metadata entity modified by the first DDL statement;

assigning a version identifier to the modified metadata entity; and sending the version identifier to one or more worker nodes.

34. The computing system of claim 21, wherein the second request is a request to commit the database transaction, the operations further comprising:

sending a third request to a slave node to mark a metadata entity modified by the first DDL statement as precommitted;

receiving a fourth request to read the metadata entity;

delaying the fourth request to read the metadata entity until the metadata entity is marked as committed or aborted; and determining a version of the metadata entity to be provided in response to the fourth request to read the metadata entity.

35. One or more computer-readable storage media comprising:

computer-executable instructions that, when executed, cause a computing device to receive a first request from a database client to initiate a database transaction;

computer-executable instructions that, when executed, cause a computing device to initiate the database transaction for the database client in response to the first request;

computer-executable instructions that, when executed, cause a computing device to, in the database transaction, execute a first data definition language (DDL) statement that modifies a metadata entity of the database system;

computer-executable instructions that, when executed, cause a computing device to, in the database transaction, execute at least a second statement, the at least a second statement being a second DDL statement or a data manipulation language (DML) statement;

computer-executable instructions that, when executed, cause a computing device to receive a second request from the database client to abort or commit the database transaction; and computer-executable instructions that, when executed, cause a computing device to atomically commit or abort the first DDL statement and the second statement as a unit, as specified by the second request.

36. The one or more computer-readable storage media of claim 35, wherein the second statement is a second DDL statement.

37. The one or more computer-readable storage media of claim 35, wherein the second statement is a DML statement.

38. The one or more computer-readable storage media of claim 35, further comprising:
  computer-executable instructions that, when executed, cause a computing device to maintain lock information for any statements in the database transaction that modify metadata information for the database system, the lock information comprising an identifier for one or more tables locked in the database transaction and an identifier for the database transaction.

39. The one or more computer-readable storage media of claim 38, further comprising:
  computer-executable instructions that, when executed, cause a computing device to analyze the lock information to determine whether a deadlock exists.

40. The one or more computer-readable storage media of claim 35, wherein the database transaction is atomically committed, the computer-executable instructions that cause the computer-system to atomically commit the first DDL statement and the second statement as a unit comprising computer-executable instructions that cause the computing system to assign a commit identifier to the first DDL statement and the at least a second statement, wherein the first DDL statement or the at least a second statement are not visible to other database clients until the commit identifier has been assigned.

41. The one or more computer-readable storage media of claim 35, wherein the first DDL statement modifies a first version of a database metadata entity and the computer-executable instructions that cause the computing device to execute the first DDL statement comprise instructions that cause the computing device to create a second version of the metadata entity.

42. The one or more computer-readable storage media of claim 35, further comprising:
  computer-executable instructions that, when executed, cause a computing device to write operations associated with the first DDL statement and the at least a second statement to an undo log; and
  computer-executable instructions that, when executed, cause a computing device to, when the second request is to abort the database transaction, read the undo log and undoing changes to the database system made by the first DDL statement and the at least a second statement.

43. The one or more computer-readable storage media of claim 35, wherein the computer-executable instructions that cause the computing system to execute the first DDL statement comprise computer-executable instructions that cause the computing system to register a callback, the callback being associated with one or more methods to undo changes to the database system made by the first DDL statement.

44. The one or more computer-readable storage media of claim 43, wherein the second request is to abort the database transaction, further comprising:
  computer-executable instructions that, when executed, cause a computing device to execute the callback.

45. The one or more computer-readable storage media of claim 35, wherein the first DDL statement and the at least a second statement are executed at different database nodes.

46. The one or more computer-readable storage media of claim 35, the further comprising:
  computer-executable instructions that, when executed, cause a computing device to receive a third request to read database data, the database data comprising data associated with a table associated with the first DDL statement;
  computer-executable instructions that, when executed, cause a computing device to assign a snapshot timestamp value to the third request;
  computer-executable instructions that, when executed, cause a computing device to compare the snapshot timestamp value to version timestamps of a plurality of versions of a metadata entity modified by the first DDL statement; and
  computer-executable instructions that, when executed, cause a computing device to select a version of the metadata entity having the largest version timestamp that is less than or equal to the snapshot timestamp value.

47. The one or more computer-readable storage media of claim 35, wherein the second request is a request to commit the database transaction, further comprising:
  computer-executable instructions that, when executed, cause a computing device to determine one or more nodes maintaining a cached copy of a metadata entity modified by the first DDL statement;
  computer-executable instructions that, when executed, cause a computing device to assign a version identifier to the modified metadata entity; and
  computer-executable instructions that, when executed, cause a computing device to send the version identifier to one or more worker nodes.

48. The one or more computer-readable storage media of claim 35, wherein the second request is a request to commit the database transaction, further comprising:
  computer-executable instructions that, when executed, cause a computing device to send a third request to a slave node to mark a metadata entity modified by the first DDL statement as precommitted;
  computer-executable instructions that, when executed, cause a computing device to receive a fourth request to read the metadata entity;
  computer-executable instructions that, when executed, cause a computing device to delay the fourth request to read the metadata entity until the metadata entity is marked as committed or aborted; and
  computer-executable instructions that, when executed, cause a computing device to determine a version of the metadata entity to be provided in response to the fourth request to read the metadata entity.

49. A method, implemented in a database environment, including by at least one computing device of the database environment comprising one or more hardware processors and at least one memory, the method comprising:
  receiving from a database client a database transaction that includes a data definition language (DDL) statement to modify or delete a metadata entity of the database system;
  executing the query language operation to create an updated version of the metadata entity;
  assigning a version timestamp to the updated version;
  sending the version timestamp to at least one of the one or more worker nodes, wherein the version timestamp invalidates a cached version of the metadata entity stored at the at least one worker node; and
  committing the database transaction.

50. The method of claim 49, wherein the sending occurs before the committing.

51. The method of claim 49, wherein the metadata entity is a definition of a table or a view.

52. The method of claim 49, wherein the transaction further comprises at least another DDL statement or comprises a data manipulation language (DML) statement, and the DDL statement and the at least another DDL statement or the DML statement are committed atomically as a unit.

53. The method of claim 49, wherein the transaction comprises at least one operation executable at the coordinator node and at least one operation executable on at least one of the worker nodes.

54. One or more computer-readable storage media comprising:
   computer-executable instructions that, when executed, cause a computing device to receive from a database client a database transaction that includes a data definition language (DDL) statement to modify or delete a metadata entity of the database system;
   computer-executable instructions that, when executed, cause a computing device to execute the query language operation to create an updated version of the metadata entity;
   computer-executable instructions that, when executed, cause a computing device to assign a version timestamp to the updated version;
   computer-executable instructions that, when executed, cause a computing device to send the version timestamp to at least one of the one or more worker nodes, wherein the version timestamp invalidates a cached version of the metadata entity stored at the at least one worker node; and
   computer-executable instructions that, when executed, cause a computing device to commit the database transaction.

55. The one or more computer-readable storage media of claim 54, wherein the sending occurs before the committing.

56. The one or more computer-readable storage media of claim 54, wherein the metadata entity is a definition of a table or a view.

57. The one or more computer-readable storage media of claim 54, wherein the transaction further comprises at least another DDL statement or comprises a data manipulation language (DML) statement, and the DDL statement and the at least another DDL statement or the DML statement are committed atomically as a unit.

58. The one or more computer-readable storage media of claim 54, wherein the transaction comprises at least one operation executable at the coordinator node and at least one operation executable on at least one of the worker nodes.

59. A method, implemented in a database environment, including by at least one computing device of the database environment comprising one or more hardware processors and at least one memory, the method comprising:
   receiving a transaction from a database client comprising a first DDL statement and at least one of at least a first DML statement and at least a second DDL statement, wherein the first DDL statement modifies or deletes a metadata entity of the database system, the metadata entity being a first version associated with a first version timestamp;
   creating a second version of the metadata entity in response to the first DDL statement;
   assigning a second version timestamp to the second version of the metadata entity; and
   committing the transaction, the committing comprising committing the first DDL statement and the first DML statement or the at least a second DDL statement as a unit;
   wherein the first and second versions are concurrently maintained on the server for a time period.

60. A computing system comprising:
   one or more memories;
   one or more processing units coupled to the one or more memories; and
   one or more computer readable storage media storing computer-executable instructions specifying operations for:
      receiving a transaction from a database client comprising a first DDL statement and at least one of at least a first DML statement and at least a second DDL statement, wherein the first DDL statement modifies or deletes a metadata entity of the database system, the metadata entity being a first version associated with a first version timestamp;
      creating a second version of the metadata entity in response to the first DDL statement;
      assigning a second version timestamp to the second version of the metadata entity; and
      committing the transaction, the committing comprising committing the first DDL statement and the first DML statement or the at least a second DDL statement as a unit;
      wherein the first and second versions are concurrently maintained on the server for a time period.

* * * * *